United States Patent
Suetsugu et al.

(10) Patent No.: US 8,713,266 B2
(45) Date of Patent: Apr. 29, 2014

(54) STORAGE APPARATUS AND METHOD INCLUDING PAGE DISCARD PROCESSING FOR PRIMARY AND SECONDARY VOLUMES CONFIGURED AS A COPY PAIR

(75) Inventors: Michio Suetsugu, Odawara (JP); Hiroshi Abei, Yokohama (JP); Haruaki Watanabe, Isehara (JP); Youichi Gotoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 872 days.

(21) Appl. No.: 12/922,771

(22) PCT Filed: Apr. 15, 2010

(86) PCT No.: PCT/JP2010/056776
§ 371 (c)(1),
(2), (4) Date: Sep. 15, 2010

(87) PCT Pub. No.: WO2011/129006
PCT Pub. Date: Oct. 20, 2011

(65) Prior Publication Data
US 2011/0258406 A1    Oct. 20, 2011

(51) Int. Cl.
G06F 13/00    (2006.01)
G06F 3/06    (2006.01)
G06F 12/12    (2006.01)

(52) U.S. Cl.
USPC ........................................................ 711/162

(58) Field of Classification Search
USPC ........................................................ 711/162
See application file for complete search history.

(56) References Cited

U.S. PATENT DOCUMENTS

| 5,193,184 A * | 3/1993 | Belsan et al. ............... 711/4 |
| 2005/0144202 A1* | 6/2005 | Chen ............................. 707/205 |
| 2007/0245114 A1 | 10/2007 | Kakui et al. ................. 711/170 |
| 2008/0147961 A1* | 6/2008 | Seki et al. .................... 711/100 |
| 2008/0177964 A1* | 7/2008 | Takahashi et al. ........... 711/162 |
| 2009/0144732 A1* | 6/2009 | Tanaka ........................... 718/1 |
| 2009/0204786 A1* | 8/2009 | Igarashi et al. .............. 711/209 |
| 2010/0082896 A1* | 4/2010 | Orikasa et al. .............. 711/111 |
| 2010/0146207 A1 | 6/2010 | Kakui et al. ................. 711/114 |

FOREIGN PATENT DOCUMENTS

| JP | 2007-517290 | 6/2007 |
| JP | 2007-310861 | 11/2007 |
| WO | 2005/064469 A1 | 7/2005 |

* cited by examiner

Primary Examiner — Tuan Thai
Assistant Examiner — Glenn Gossage
(74) Attorney, Agent, or Firm — Brundidge & Stanger, P.C.

(57) ABSTRACT

A storage apparatus having a plurality of logical volumes includes a storage device, and a storage controller that operates each of the logical volumes as a virtual volume. A primary volume and a secondary volume are configured as a copy pair in which data in the primary volume can be copied to the secondary volume. If the primary volume receives a discard request for a unit physical storage area, the storage controller determines whether or not a unit physical storage area exists configuring the secondary volume corresponding to the unit physical storage area, which is a target of the discard request. If the unit physical storage area configuring the secondary volume exists, an instruction is transmitted to the secondary volume to discard the page or unit physical storage area assigned to the secondary volume.

6 Claims, 34 Drawing Sheets

LU MANAGEMENT TABLE 1103

| PORT NUMBER 11031 | LUN 11032 | LDEV NUMBER 11033 | VIRTUAL VOLUME BIT 11034 |
|---|---|---|---|
| 1A | 0000 | 01:02 | 0 |
| 1B | 0001 | 01:03* | 1 |

FIG. 10

VIRTUAL LDEV MANAGEMENT TABLE 1104

| VIRTUAL LDEV NUMBER 11041 | POOL NUMBER 11042 |
|---|---|
| 01:03* | 0001 |
| 01:04* | 0002 |

FIG. 11

POOL MANAGEMENT TABLE 1105

| POOL NUMBER 11051 | POOL CONFIGURING LDEV LIST 11052 |
|---|---|
| 0001 | 02:01, 02:02, 02:03 |
| 0002 | 03:01, 03:02, 03:03 |

FIG. 12

MAPPING MANAGEMENT TABLE 1106

| VIRTUAL LDEV 01:03* 11061 | PAGE NUMBER 11062 | VIRTUAL LDEV ADDRESS 11063 | POOL CONFIGURING LDEV NUMBER 11064 | ACTUAL STORAGE AREA ADDRESS 11065 |
|---|---|---|---|---|
| | 1 | 0001 | 02:01 | 0000 |
| | 2 | 0010 | 02:02 | 00FF |

FIG. 13

POOL CONFIGURING LDEV MANAGEMENT TABLE 1107

| POOL CONFIGURING LDEV NUMBER 11071 | POINTER FOR CONTROL BIT ALIGNMENT 11072 |
|---|---|
| 02:01 | *1 |
| 02:02 | *2 |

ADDRESS

| | 0 | 1 | 2 | ... |
|---|---|---|---|---|
| | 1 | 1 | 0 | 0 |

FIG. 14

DIFFERENTIAL BITMAP 1900 (IN UNITS OF SLOTS)

PAGE DISCARD MANAGEMENT TABLE 2000 (IN UNITS OF PAGES)

PAGE DISCARD MANAGEMENT TABLE 2000 (IN UNITS OF LDEVS)

PAIR STATUS MANAGEMENT TABLE 2200

| PRIMARY VOLUME SLOT NUMBER (2201) | SECONDARY VOLUME SLOT NUMBER (2202) | PAIR STATUS (2203) |
|---|---|---|
| 01:01:01 | 04:01:01 | PAIR |
| 01:02*:01 | 04:02*:01 | SUSPEND |

FIG. 22

PAIR STATUS MANAGEMENT TABLE 2700

| LOCAL STORAGE APPARATUS (MCU) | | PAIR DESTINATION STORAGE APPARATUS (RCU) | | | PAIR STATUS |
|---|---|---|---|---|---|
| PORT NUMBER | SLOT NUMBER | APPARATUS NUMBER | PORT NUMBER | SLOT NUMBER | |
| 1A | 01:02:01 | 11111 | 2A | 01:01:01 | PAIR |
| 1B | 01:03*:01 | 11111 | 2B | 01:04*:01 | SUSPEND |
| 2701 | 2702 | 2703 | 2704 | 2705 | 2706 |

FIG. 27

SECONDARY VOLUME PAGE DISCARD (DELETION) INFORMATION 2900

| LOCAL STORAGE APPARATUS (MCU) | | PAIR DESTINATION STORAGE APPARATUS (RCU) | | | PAGE DISCARD BIT |
|---|---|---|---|---|---|
| PORT NUMBER | PAGE NUMBER | APPARATUS NUMBER | PORT NUMBER | PAGE NUMBER | |
| 1A | 01:02*:01 | 11111 | 2A | 01:01*:01 | 0 |
| 1B | 01:03*:01 | 11111 | 2B | 01:04*:01 | 1 |
| 2901 | 2902 | 2903 | 2904 | 2905 | 2906 |

FIG. 29

JOURNAL CONTROL INFORMATION 3500 (CONVENTIONAL)

| PRIMARY VOLUME | | | | JOURNAL VOLUME | | | JOURNAL SEQUENCE NUMBER |
|---|---|---|---|---|---|---|---|
| LDEV NUMBER | SLOT NUMBER | HEAD WRITE ADDRESS | DATA LENGTH | LDEV NUMBER | SLOT NUMBER | HEAD WRITE ADDRESS | |
| 01:02* | 01 | 0x00000000 | 512 | 02:02 | 03 | 0xFFFFFFFF | 1 |
| 3501 | 3502 | 3503 | 3504 | 3505 | 3506 | 3507 | 3508 |

JOURNAL CONTROL INFORMATION 3500 (IN THIS EMBODIMENT)

| | PRIMARY VOLUME | | | JOURNAL VOLUME | | | | |
| --- | --- | --- | --- | --- | --- | --- | --- | --- |
| LDEV NUMBER | SLOT NUMBER | HEAD WRITE ADDRESS | DATA LENGTH | LDEV NUMBER | SLOT NUMBER | HEAD WRITE ADDRESS | JOURNAL SEQUENCE NUMBER | PAGE DISCARD BIT |
| 01:02* | 01 | 0x00000000 | 512 | 02:02 | 03 | 0xFFFFFFFF | 1 | 1 |
| 3501 | 3502 | 3503 | 3504 | 3505 | 3506 | 3507 | 3508 | 3509 |

PAIR STATUS MANAGEMENT TABLE 3600

| JOURNAL PAIR NUMBER | LOCAL DISK ARRAY DEVICE (MCU) | | PAIR DESTINATION DISK ARRAY DEVICE (RCU) | | | PAIR STATUS |
|---|---|---|---|---|---|---|
| | PORT NUMBER | SLOT NUMBER | APPARATUS NUMBER | PORT NUMBER | SLOT NUMBER | |
| 01 | 1A | 01:02:01 | 11111 | 2A | 01:01:01 | PAIR |
| 02 | 1B | 01:03*:01 | 11111 | 2B | 01:04*:01 | SUSPEND |
| 3601 | 3602 | 3603 | 3604 | 3605 | 3606 | 3607 |

FIG. 36

STORAGE APPARATUS AND METHOD INCLUDING PAGE DISCARD PROCESSING FOR PRIMARY AND SECONDARY VOLUMES CONFIGURED AS A COPY PAIR

TECHNICAL FIELD

This invention relates to a storage apparatus and a control method of the storage apparatus, specifically to a storage apparatus which enables the efficient use of the limited storage capacity of the storage device and a control method of the storage apparatus.

BACKGROUND ART

Conventionally, a technology is well-known in which, instead of fixed assignment of a logical storage area available to a computer, a virtual volume which is a virtual logical storage area including the storage capacity available to the maximum limit is specified, and by assigning the required physical storage area each time the computer requires, the storage capacity of the storage device which provides the logical storage area is efficiently utilized. This technology is generally referred to as Thin Provisioning or by other terms.

For example, in the Patent Literature 1, for a virtual volume assigned to a higher-level device (host) by the Thin Provisioning technology, the configuration is proposed in which, by discarding an actual storage area assigned to the virtual volume (hereinafter, the unit of assigning the storage area from this actual storage area to the virtual volume is referred to as a "page" (unit physical storage area)) and making the same available to the other virtual volumes, the actual storage area is efficiently utilized. That is, by specifying a page desired to be discarded from the host and issuing a discard command to the page (address), the storage apparatus is made to perform the discard processing of the relevant page.

CITATION LIST

Patent Literature

[PTL 1] Japanese Patent Application Laid-open Publication No. 2007-310861

SUMMARY OF INVENTION

Technical Problem

However, the configuration of the Patent Literature 1 had the problem that, if the storage apparatus is in the configuration which has a copy pair having a primary volume and a secondary volume and if the discard processing for a certain page of the primary volume is instructed from the host, although the relevant page of the primary volume is discarded in accordance with the instruction, the corresponding page copied to the secondary volume cannot be discarded, and therefore the efficient operation of the storage resource cannot be fully achieved.

This invention is made for solving the above-mentioned and other problems, and the purpose of the same is to provide a storage apparatus which enables the efficient use of the limited storage capacity of the storage device and a control method of the storage apparatus.

Solution to Problem

For achieving the above-mentioned and the other purposes, an aspect of this invention is a storage apparatus having a plurality of logical volumes, each providing a data storage area to an external device, the storage apparatus including a storage device providing a physical storage area, and a storage controller. The storage controller creates a plurality of unit physical storage areas from the storage device, operates each of the logical volumes as a virtual volume in which, in response to a data IO request from the external device, a unit physical storage area is added to each of the logical volumes, selects any one of the logical volumes as a primary volume, selects any one of the rest of the logical volumes as a secondary volume, the primary volume and the secondary volume being configured as a copy pair in which data in the primary volume can be copied to the secondary volume, when the primary volume receives from the external device a discarding request for a unit physical storage area of the plurality of unit physical storage areas, determine whether or not a unit physical storage area exists in, the secondary volume corresponding to the unit physical storage area which is a target of the discarding request, and when it is determined that the unit physical storage area exists in the secondary volume corresponding to the unit physical storage area which is the target of the discarding request, transmit to the secondary volume an instruction for discarding the unit physical storage area assigned to the secondary volume.

Advantageous Effects of Invention

According to this invention, a storage apparatus which enables the efficient use of the limited storage capacity of the storage device and a control method of the storage apparatus can be provided.

BRIEF DESCRIPTION OF DRAWINGS

FIG. 10 is an example of an LU management table 1103.

FIG. 11 is an example of a virtual LDEV management table 1104.

FIG. 12 is an example of a pool management table 1105.

FIG. 13 is an example of a mapping management table 1106.

FIG. 14 is an example of a pool configuring LDEV management table 1107.

FIG. 22 is an example of a pair status management table 2200.

FIG. 27 is an example of a pair status management table 2700 in Embodiment 2.

FIG. 29 is an example of secondary volume page discard information 2900.

FIG. 35A is an example of conventional journal control information 3500.

FIG. 35B is an example of journal control information 3500 in Embodiment 3.

FIG. 36 is an example of a pair status management table 3600 in Embodiment 3.

DESCRIPTION OF EMBODIMENTS

Hereinafter, this invention is described in line with the embodiments of the same.
Embodiment 1
Configuration of Storage System 1

Figure 1:
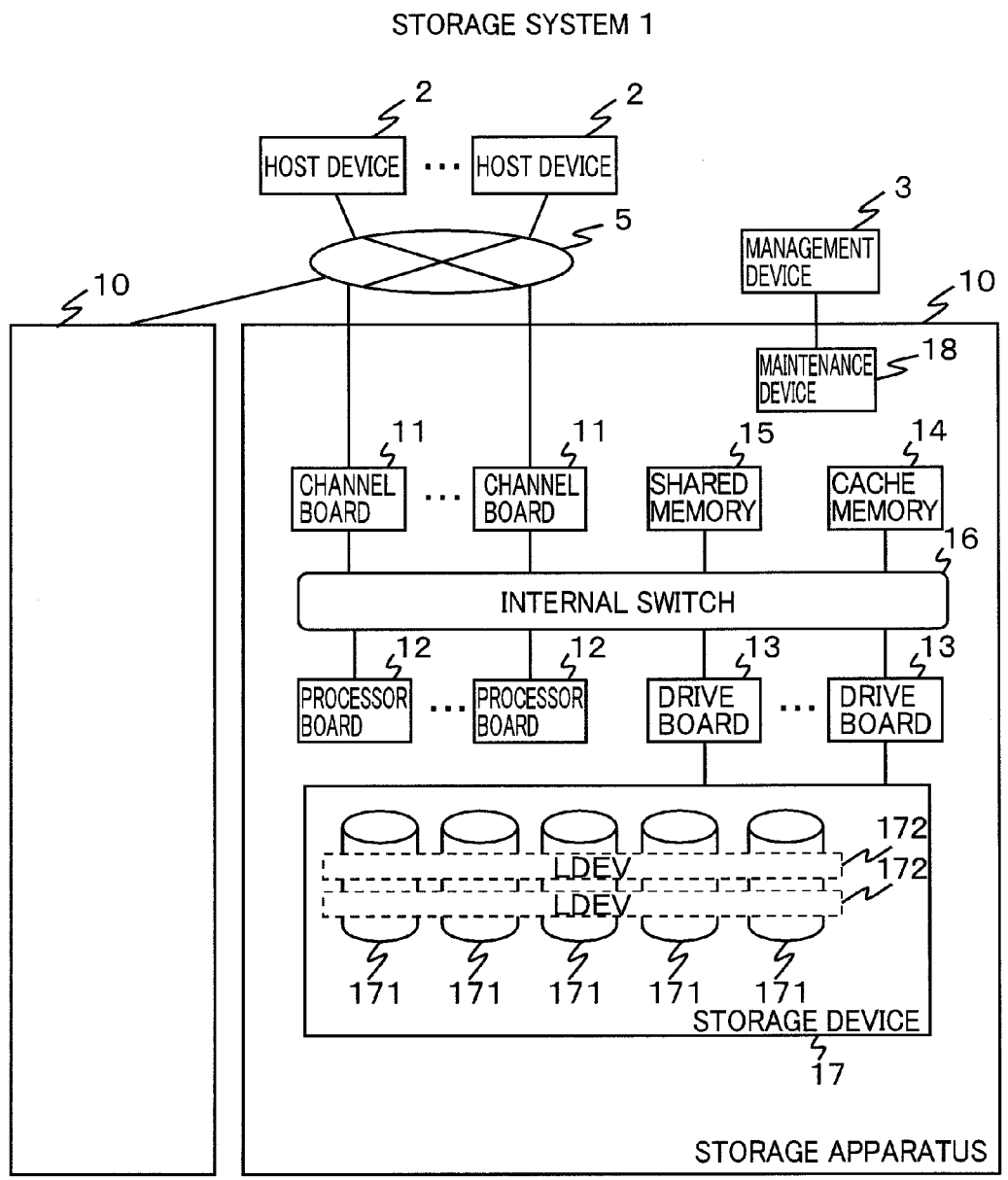
FIG. 1 is a diagram showing a schematic configuration of a storage system 1.

FIG. 1 shows the configuration of the storage system 1 related to Embodiment 1 of this invention. As shown in the figure, this storage system 1 is configured including host devices 2 (external devices), storage apparatuses 10 communicating with host devices 2 via a communication network 5, and a management device 3 connected to the storage apparatus 10 as communicable via a LAN (Local Area Network) and others. Though two storage apparatuses 10 are connected via the communication network 5 in the storage system 1 of FIG. 1, the number of connected storage apparatuses 10 may also be 1, 3, or more. Furthermore, in FIG. 1, as the configuration as a storage apparatus 10 is the same, the internal configuration of one of the storage apparatuses 10 is not shown in the figure. As for the two storage apparatuses 10 shown in FIG. 1, for example, one configures a primary control unit (Main Control Unit, hereinafter referred to as an "MCU") which includes a primary volume for continuously accepting data I/O from the host devices 2 and processing the same, and the other storage apparatus 10 configures a secondary control unit (Remote Control Unit, hereinafter referred to as an "RCU") which controls a secondary volume to be the target of the data copy processing from the primary volume complying with the instruction from the MCU. Hereinafter, the data copy processing performed among multiple volumes in the MCU is referred to as local copy, and the data copy processing performed between the primary volume in the MCU and the secondary volume in the RCU is referred to as remote copy.

The communication network 5 is, for example, LAN, SAN (Storage Area Network), the internet, a public telecommunication network or others. The communication between the host devices 2 and the storage apparatuses 10 is performed using the protocols of TCP/IP, iSCSI (internet Small Computer System Interface), Fibre Channel Protocol (Fibre Channel Protocol), FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and others.

The host device 2 is an information processing device (computer) which utilizes the storage area provided by the storage apparatus 10. For example, the host device 2 is configured using hardware such as a personal computer, a mainframe (Mainframe), an office computer, and others. The host device 2, when accessing the above-mentioned storage area, transmits a data I/O request to the storage apparatus 10.

The storage apparatus 10 includes one or more channel boards 11, one or more processor boards 12 (Micro Processors), one or more drive boards 13, a cache memory 14 (Cache Memory), a shared memory 15 (Shared Memory), an internal switch 16, a storage device 17, and a maintenance device 18 (Service Processor). Among these, the channel boards 11, the processor boards 12, the drive boards 13, the cache memory 14, and the shared memory 15 are connected to each other as communicable via the internal switch 16.

The channel board 11 accepts data I/O requests transmitted from the host device 2 (data write requests, data read requests, and others), and transmits responses of the processing for the accepted data I/O requests (e.g., the read data, read completion notification, and write completion notification) to the host device 2. The channel board 11 includes the function related to the protocol control for the communication with the host device 2. Furthermore, the channel board 11 in this embodiment provides a virtual storage area for the host device 2 which is the basic configuration of this embodiment and the hardware board for the channel control unit 110 assigned to the virtual storage area which is the function block for achieving the page discard function. This is described later in details.

The processor board 12, in accordance with the above-mentioned data I/O requests which the channel board 11 receives, performs the processing related to data transfer which is performed among the channel board 11, the drive board 13, and the cache memory 14. The processor board 12 performs the delivery of data (the data read from the storage device 17, the data to be written to the storage device 17) between the channel board 11 and the drive board 13 performed, for example, via the cache memory 14 and, for the data stored in the cache memory 14, staging (reading data from the storage device 17) and destaging (writing data to the storage device 17).

The cache memory 14 is configured, for example, by using a RAM (Random Access Memory) capable of high-speed access. In the cache memory 14, the data to be written to the storage device 17 (hereinafter referred to as write data) and the data read from the storage device 17 (hereinafter referred to as read data) are stored. In the shared memory 15, various types of information used for controlling the storage apparatus 10 are stored.

The drive board 13, for reading data from the storage device 17 or for writing data to the storage device 17, performs the communication with the storage device 17. The internal switch 16 is configured, for example, by using a high-speed crossbar switch (Cross Bar Switch). The communication performed via the internal switch 16 is performed, for example, complying with the protocols of Fibre Channel, iSCSI, TCP/IP, and others. The drive board 13, with the processor board 12, provides the hardware basis of the disk control unit 120 (described later) which provides the function of controlling the data I/O for the storage device 17.

The storage device 17 is configured of multiple storage media (hard disk drives (Hard Disk Drives, hereinafter referred to as "HDDs"), semiconductor storage device (Solid State Drives, hereinafter referred to as "SSDs"), flexible disks, magnetic tapes, and optical disks). In the description below, the storage device 17 is assumed to be configured by using HDDs or SSDs of, for example, SAS (Serial Attached SCSI), SATA (Serial ATA), FC (Fibre Channel), PATA (Parallel ATA), SCSI, and other types (hereinafter, the storage media such as HDDs and SSDs are collectively referred to as storage drives 171).

The storage device 17 provides a storage area in units of logical devices (LDEVs 172 (LDEV: Logical Device)) configured by using the storage area (e.g., the storage area of a RAID group (parity group (Parity Group))) which is provided by controlling the storage drives 171 by RAID (Redundant Array of Inexpensive (or Independent) Disks) or other control methods. As described later, the storage apparatus 10 provides a logical storage area (hereinafter referred to as LUs (Logical Units)) configured by using LDEVs 172 to the host device 2.

Figure 2:
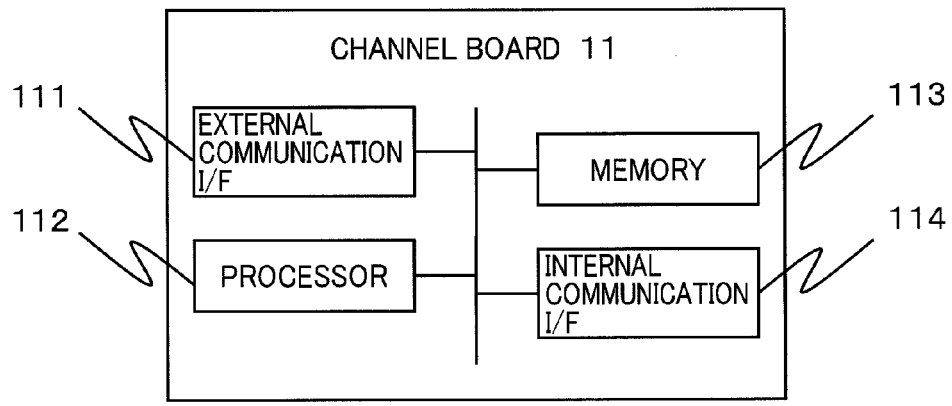
FIG. 2 is an example of the hardware configuration of a channel board 11.

FIG. 2 shows the hardware configuration of the channel board 11. The channel board 11 includes an external communication interface 111 (hereinafter referred to as an external communication I/F 111) including a port (communication port) for the communication with the host device 2, a processor 112 (including a frame processing chip and a frame transfer chip which are described later), a memory 113, and an internal communication interface (hereinafter referred to as an internal communication I/F 114) including a port (communication port) for the communication with the processor board 12.

Among these, the external communication I/F 111 is configured, for example, by using an NIC (Network Interface Card) or an HBA (Host Bus Adapter). The processor 112 is configured, for example, by using a CPU (Central Processing Unit) or an MPU (Micro Processing Unit). The memory 113 is a RAM (Random Access Memory) or a ROM (Read Only Memory). The internal communication I/F 114, via the internal switch 16, performs the communication with the processor board 12, the drive board 13, the cache memory 14, and the shared memory 15.

Figure 3:
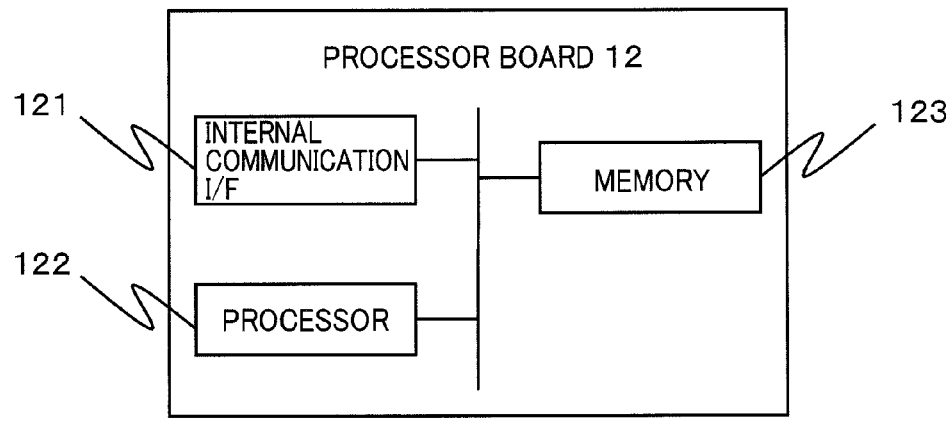
FIG. 3 is an example of the hardware configuration of a processor board 12.

FIG. 3 shows the hardware configuration of the processor board 12. The processor board 12 includes an internal communication interface 121 (hereinafter referred to as an internal communication I/F 121), a processor 122, and a memory 123 (local memory) whose access performance from the processing 122 is higher than the shared memory 15 (capable of high-speed access). The internal communication I/F 121, via the internal switch 16, performs the communication with the channel board 11, the drive board 13, the cache memory 14, and the shared memory 15. The processor 122 is, for example, a CPU, an MPU, or a DMA (Direct Memory Access). The memory 123 is a RAM or a ROM. Note that, though the processor 122 can access both the memory 123 and the shared memory 15, the access rate of the memory 123, seen from the processor 122, is higher than the rate of the shared memory 15 (the access performance is higher), and therefore the access cost of the memory 123 is lower than the cost of the shared memory 15.

Figure 4:
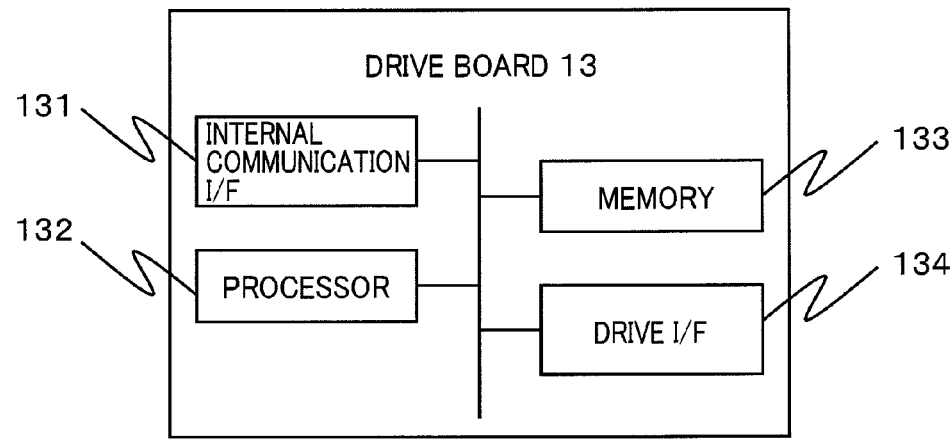
FIG. 4 is an example of the hardware configuration of a drive board 13.

FIG. 4 shows the hardware configuration of the drive board 13. The drive board 13 includes an internal communication interface 131 (hereinafter referred to as an internal communication I/F 131), a processor 132, and a memory 133, and a drive interface 134 (hereinafter referred to as a drive I/F 134). The internal communication I/F 131, via the internal switch 16, performs the communication with the channel board 11, the processor board 12, the cache memory 14, and the shared memory 15. The processor 132 is, for example, a CPU or an MPU. The memory 133 is, for example, a RAM or a ROM. The drive I/F 134 communicates with the storage device 17. Note that the allocation of the channel board 11, the processor board 12, and the drive board 13 as hardware is an example, and another form of board configuration may also be adopted.

The maintenance device 18 shown in FIG. 1 (Service Processor, hereinafter referred to as the "SVP") is a computer including a CPU and a memory. The maintenance device 18 performs the control and status monitoring of each component in the storage apparatus 10. The maintenance device 18, via the internal switch 16 or a communication means such as the LAN, performs the communication with the components in the storage apparatus 10 such as the channel board 11, the processor board 12, the drive board 13, the cache memory 14, the shared memory 15, and the internal switch 16. The maintenance device 18 acquires operation information and other types of information from the components in the storage apparatus 10 as needed, and provides the same to the management device 3. The maintenance device 18, in accordance with the information transmitted from the management device 3, can instruct the processing for blockading the storage drive 171 including the LDEVs 172 and other processing.

Figure 5:
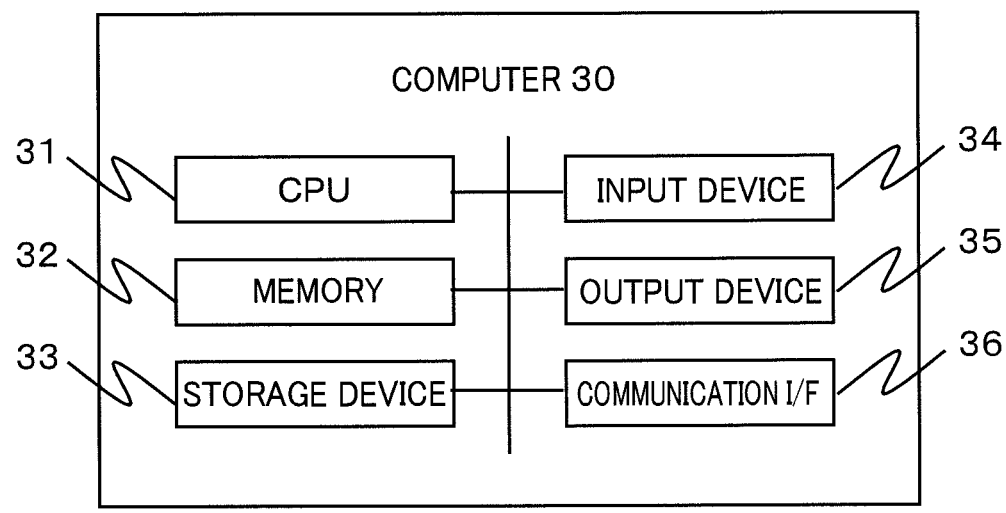
FIG. 5 is an example of the hardware configuration of a computer 30.

FIG. 5 shows an example of the computer (information processing device) available as a management device 3. As shown in FIG. 5, the computer 30 includes a CPU 31, a volatile or non-volatile memory 32 (a RAM or a ROM), a storage device 33 (e.g. an HDD or an SSD), an input device 34 such as a keyboard or a mouse, an output device 35 such as an LCD monitor or a printer, and a communication interface 36 (hereinafter referred to as a communication I/F 36) such as an NIC or an HBA. The management device 3 is, for example, a personal computer or an office computer. The management device 3 may also be configured as integrated (installed in the same chassis) with the storage apparatus 10. The management device 3 is connected to the maintenance device 18 as communicable via the LAN or others. The management device 3 includes a user interface by using a GUI (Graphical User Interface), a CLI (Command Line Interface) or others for controlling and monitoring the storage apparatus 10.

Configuration of Logical Storage Area Provided to Host Device 2

Figure 6:
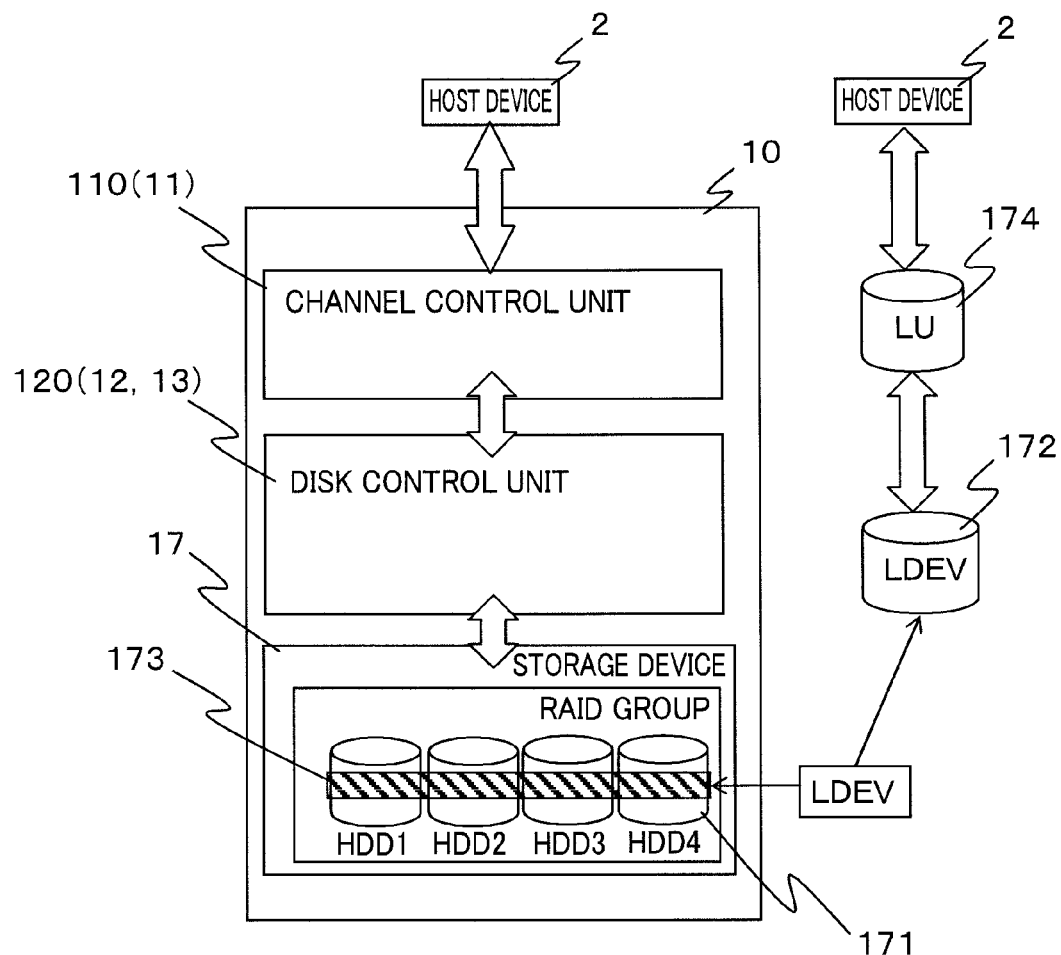
FIG. 6 is a schematic diagram showing the configuration in which a logical storage area is provided by a storage apparatus 10.

The configuration of the logical storage area provided to each host device 2 by the above-mentioned hardware boards in the storage system 1 is described with reference to FIG. 6. FIG. 6 is a schematic diagram showing the configuration in which the actual storage area of the storage drive 171 is provided to the host device 2 as a logical storage area by the storage apparatus 10.

The disk control unit 120 forms a RAID group 173 from the storage drives 171 prepared in the storage device 17 of the storage apparatus 10, and configures an LDEV 172 from the RAID group 173. The channel control unit 110 provides the LDEV 172 as logical volumes 174 (Logical Units, LUs) which are multiple unit logical storage areas to the host device 2.

Figure 7:
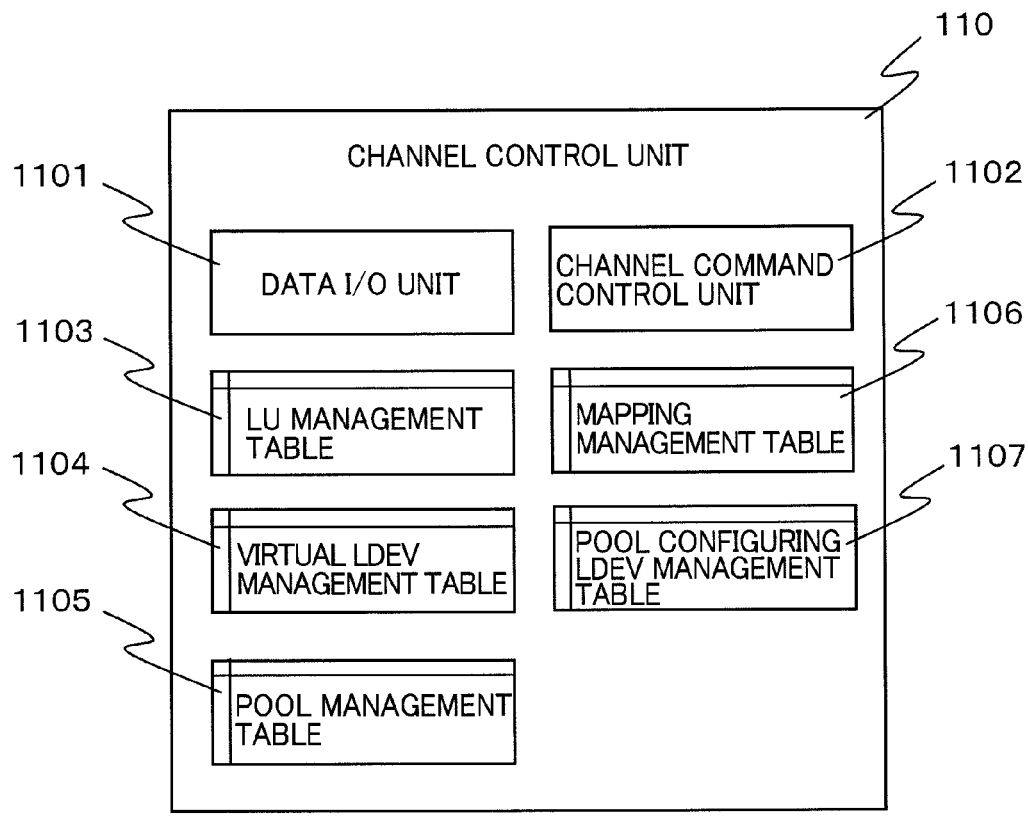
FIG. 7 is an example of the software configuration of a channel control unit 110.
Figure 8:
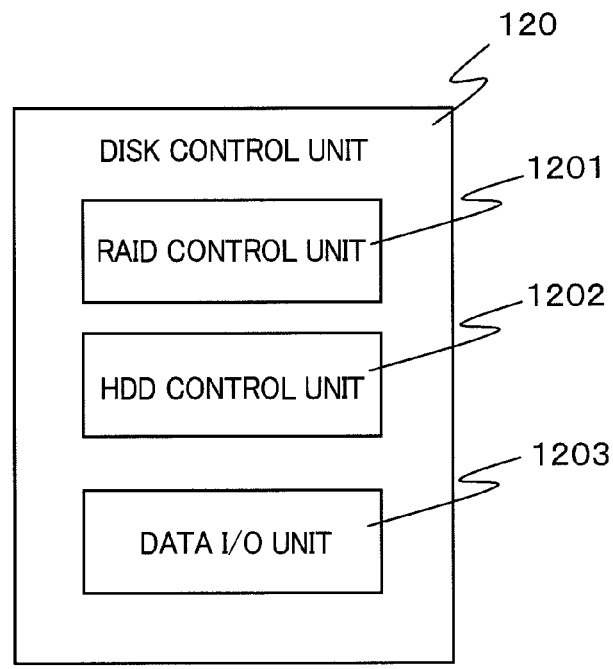
FIG. 8 is an example of the software configuration of a disk control unit 120.

Next, the functions of the channel control unit 110 and the disk control unit 120 are described more specifically. FIG. 7 shows an example of the software configuration of the channel control unit 110, and FIG. 8 shows an example of the software configuration of the disk control unit 120.

The channel control unit 110 includes a data I/O unit 1101 and a channel command control unit 1102 which are the function blocks covering the main functions of the same. Furthermore, the channel control unit 110, as the tables to be referred to by the channel command control unit 1102 for performing data processing, includes a LU management table 1103, a virtual LDEV management table 1104, a pool management table 1105, a mapping management table 1106, and an pool configuring LDEV management table 1107.

The programs including the functions of the data I/O unit 1101 and the channel command control unit 1102, the LU management table 1103, the virtual LDEV management table 1104, the pool management table 1105, the mapping management table 1106, and the pool configuring LDEV management table 1107 are stored in the memory 113 of the channel board 11. By the processor 112 reading the above-mentioned programs from the memory 113 and performing the same, the functions of the data I/O unit 1101 and the channel command control unit 1102 are achieved. Note that the management tables may also be stored in the shared memory 14.

The data I/O unit 1101 performs the data input/output processing between the host device 2 and the disk control unit 120.

The channel command control unit 1102 provides the LUs 174 created from the storage device 171 to the host device 2. That is, the channel command control unit 1102 receives commands issued by the host device 2 to the LUs 174, processes the same, and converts the same into the access to the LDEV 172 which is the unit of actual storage area. As described above, the LDEV 172 is a volume created by logically dividing a part of the RAID group 173 configured of multiple storage devices 171.

In this embodiment, as the logical storage area to be provided to the host device 2, with the actual storage area created by directly dividing a part of the physical storage area of the storage device 171, accesses from the host device 2 are accepted, although the actual storage area to be provided to the host device 2 is not prepared in advance, and the virtual LDEVs to be provided can be provided by assigning the same when actually utilizing the same. In this embodiment, the LUs 174 are assigned to the LDEV 172 including the actual storage area or a virtual LDEV. The LUs 174 assigned to the virtual LDEV are hereinafter referred to as virtual LUs. The virtual LDEV and the virtual LUs are described later.

The disk control unit 120 includes a RAID control unit 1201, an HDD control unit 1202, and a data I/O unit 1203. In the memory 133 of the drive board 13, the programs including the functions of the RAID control unit 1201, the HDD control unit 1202, and the data I/O unit 1203 are stored. By the processor 132 reading these programs from the memory 133 and performing the same, the functions of the RAID control unit 1201, the HDD control unit 1202, and the data I/O unit 1203 are achieved.

The RAID control unit 1201 configures a RAID group 173 from multiple HDDs (storage drives) 171, and provides the LDEV 172 to the channel command control unit 1102 of the channel control unit 110. The HDD control unit 1202, in accordance with requests from the RAID control unit 1201, performs data read/write processing for the HDDs 171. The data I/O unit 1203 performs the data input/output processing between the channel control unit 110 and the storage device 17.

Description of Thin Provisioning Function

Figure 9:
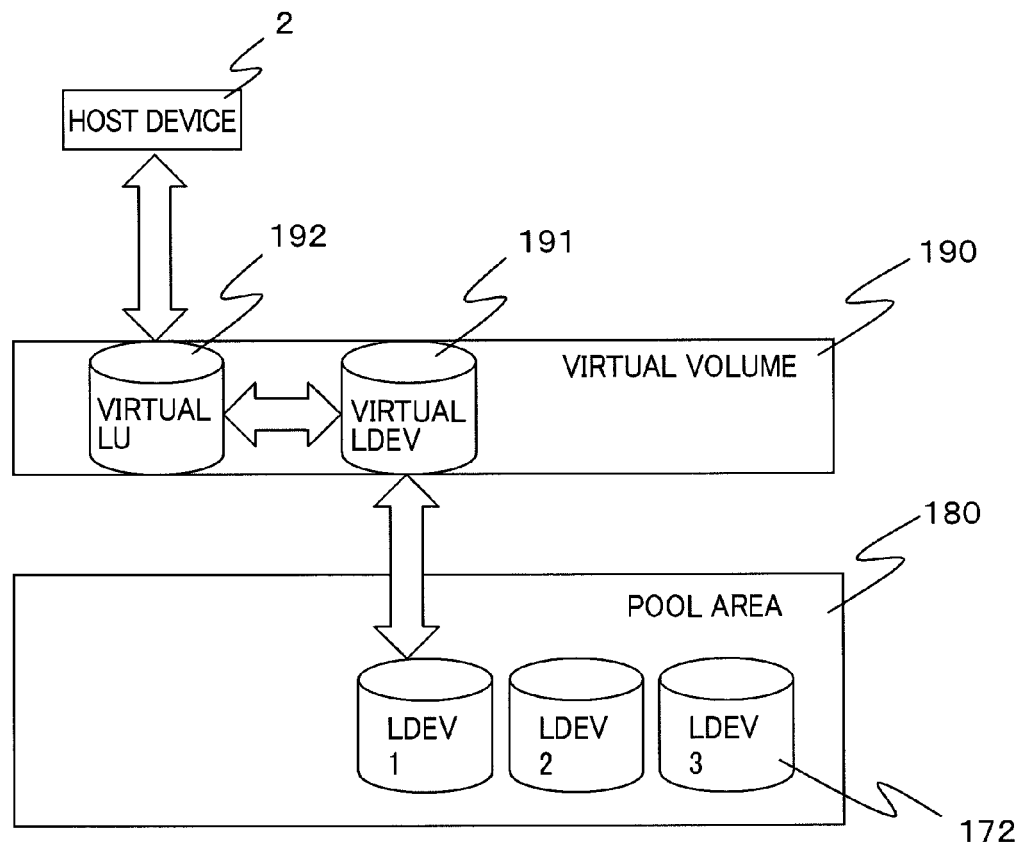
FIG. 9 is a schematic diagram showing the overview of the configuration which provides the Thin Provisioning function.

Next, the configuration of the Thin Provisioning function achieved by using a virtual LDEV 191 is described. FIG. 9 shows a schematic diagram of the overview of the configuration which provides the Thin Provisioning function.

As described above, the Thin Provisioning function is a technology for efficiently utilizing storage resources in the storage apparatus 10. The Thin Provisioning function indicates that the storage apparatus 10 provides a virtual volume 190 without any actual storage area (a volume which includes a virtual LU 192 and a virtual LDEV 191) to the host device 2 which is a higher-level device, and a pool area 180 configured as a set of actual storage areas called a pool is made to correspond to this virtual LU 192.

If a host device 2 accesses a virtual LU 192, the channel command control unit 1102 of the channel control unit 110, in the storage device 17 dynamically assigns an actual storage area provided by the LDEV 172 included in the pool area 180 to the virtual storage area of the virtual volume 190 which the host device 2 accessed. As described above, the assignment unit of the actual storage area based on this LDEV 172 assigned to the virtual volume 190 is assumed to be referred to as a "page."

According to this Thin Provisioning function, multiple virtual volumes 190 can be made to correspond to one pool area 180, and therefore the storage apparatus 10 can provide a virtual volume 190 with a larger capacity than the actual storage capacity of the storage devices 171 which is seemingly installed in the storage device 17 to the host device 2. If the actual storage area included in the pool area 180 becomes insufficient, it is not necessary to terminate the storage system 1 and reconstruct the logical volume, and the additional installation of storage devices 171 which provide an actual storage area is all that is required. According to the Thin Provisioning function, the advantages are that the cost related to the actual storage capacity which is prepared at the time of installing the storage system 1 can be reduced and that the operation management cost at the time of additional installation can be reduced.

Referring to FIG. 9, if the Thin Provisioning function is utilized, the host device 2 accesses the virtual LDEV 191 via the virtual LU 192. As the actual storage area provided by the LDEVs 172 configuring the pool area 180 is made to correspond to the virtual LDEV 191 in units of pages, to the virtual LU 192 which the host device 2 accesses, the actual storage area provided by the LDEVs 172 via the virtual LDEV 191 as needed is supposed to be assigned as pages.

The relationship between the virtual LU 192 accessed by the host device 2, the virtual LDEV 191, and the actual storage area of the LDEVs 172 is managed by the management table storing the mapping information which is described later. If the virtual volume 190 is accessed by the host device 2, mapping is performed dynamically in the storage apparatus 10, and the storage apparatus 10, by utilizing this mapping information, determines the correspondence relationship between the virtual volume 190 and the actual storage area.

As more specifically described, the channel command control unit 1102 of the channel control unit 110 handles the Thin Provisioning function. At this point, the channel command control unit 1102, with reference to the. LU management table 1103, the virtual LDEV management table 1104, the pool management table 1105, the mapping management table 1106, and the pool configuring LDEV management table 1107 which are stored in the memory 113 of the channel board 11, manages the correspondence relationship between the virtual volume 190 and the actual storage area. Hereinafter, the respective management tables are described.

LU Management Table 1103

The LU management table 1103 is a table for managing the correspondence between the list of LUs 174 which accept accesses from the host device 2 and the LDEVs 172 of the same. FIG. 10 shows an example of the LU management table 1103.

In the LU management table 1103, respective items of a port number 11031, a LUN 11032, an LDEV number 11033, and a virtual volume bit 11034 are made to correspond to each other and are stored.

The port number 11031 is an identification sign indicating a communication port specified for the channel control unit 110 to communicate with the host device 2. The LUN 11032 is a LUN (Logical Unit Number) which is an identification sign provided to an LU 174 which the host device 2 accesses via the communication port specified by the corresponding port number 11031.

The LDEV number 11033 shown as a CU #: LDEV # is a combination of a logical control unit (Control Unit, CU) made to correspond to the LU 174 identified by the LUN 11032 and the LDEV 172, and the sign # indicates a "number." The CU is, in this embodiment, equivalent to the combination of the channel control unit 110 and the disk control unit 120, and indicates a set of logically interpreted control devices which accept accesses from the host device 2 and process the same.

In this application, to ease the understanding, as shown in FIG. 10 for example, if a virtual LDEV 191 is made to correspond to an LU 174, a sign "*" is added to the LDEV # to be identifiable. The virtual volume bit 11034 is an identification sign to indicate whether the LDEV stored in the virtual LDEV number 11033 is an LDEV 172 configured of the fixed actual storage area (hereinafter referred to as an "actual LDEV 172" if necessary) or a virtual LDEV 191. The case where the virtual volume bit 11034 is 0 indicates that the actual LDEV 172 is made to correspond while 1 indicates that the virtual LDEV 191 is made to correspond. The example of FIG. 10 indicates that the first record is related to the actual LDEV 172 and that the second record is related to the virtual LDEV 191.

Virtual LDEV Management Table 1104

The virtual LDEV management table 1104 is a table for managing the correspondence between the list of virtual LDEVs 191 which the storage apparatus 10 includes and the pool areas 180 mapped to the virtual LDEVs 191. FIG. 11 shows an example of the virtual LDEV management table 1104.

In the virtual LDEV management table 1104, a virtual LDEV number 11041 indicated by CU #: LDEV # to identify a virtual LDEV 191 and a pool number 11042 which is an identification sign to identify a pool area 180 to which the actual storage area configuring the virtual LDEV 191 belongs are made to correspond to each other and are stored.

Pool Management Table 1105

The pool management table 1105 is a table for making a pool area 180 which the storage apparatus 10 includes and actual LDEVs 172 configuring the pool area 180 correspond to each other and managing the same. FIG. 12 shows an example of the pool management table 1105.

In the pool management table 1105, a pool number 11051 and a pool configuring LDEV list 11052 are made to correspond to each other and are stored. The pool number 11051 is the same as the pool number 11042 in the virtual LDEV management table 1104 in FIG. 11. The pool configuring LDEV list 11052 is a list of actual LDEVs 172 (pool configuring LDEVs) configuring the pool area 180 identified by the corresponding pool number 11051, and each actual LDEV 172 is indicated by a combination of a logical control unit number (CU #) which handles the actual LDEV 172 and an LDEV number (LDEV #) which is a number for identifying the included actual LDEV 172.

Mapping Management Table 1106

The mapping management table 1106 is a management table for holding the correspondence relationship, for each virtual LDEV 191, between the address in the virtual LDEV 191 and the actual storage area address of the pool configuring LDEV 172 in the assigned pool area 180. FIG. 13 shows an example of the mapping management table 1106.

In the mapping management table 1106, for each virtual LDEV 191, a page number 11062, a virtual LDEV address 11063, a pool configuring LDEV 11064, and an actual storage area address 11065 are made to correspond to each other and are stored.

The virtual LDEV 11061 identifies a virtual LDEV 191 by an identification sign CU #: LDEV#. For the page number 11062, an identification sign for identifying a page which is a unit actual storage area included in the virtual LDEV 191 identified by the virtual LDEV 11061 is recorded.

The virtual LDEV address 11063 is a head block address in the corresponding virtual LDEV 191. The pool configuring LDEV number 11064 is an identification sign for identifying an actual LDEV 172 made to correspond to the page identified by the page number 11062. The actual storage area address 11065 is a head block address of the actual storage area identified by the corresponding pool configuring LDEV number 11064.

The mapping management table 1106 is held in each virtual LDEV 191 created by the storage apparatus 10, and makes the page assigned to each virtual LDEV 191 and an actual storage area correspond to each other by the block address.

Pool Configuring LDEV Management Table 1107

The pool configuring LDEV management table 1107 is a management table for indicating how the actual storage area included in the pool configuring LDEV is mapped to the area of the virtual LDEV 191. FIG. 14 shows an example of the pool configuring LDEV management table 1107.

In the pool configuring LDEV management table 1107, a pool configuring LDEV number 11071 and a pointer for a control bit alignment 11072 are made to correspond to each other and are stored. The pool configuring LDEV number 11071 is the same as the pool configuring LDEV number 11064 in the mapping management table 1106 in FIG. 13. The pointer for a control bit alignment 11072 shows a pointer for a control bit alignment (control information) indicating the mapping status of each pool configuring LDEV number 11071. As shown in FIG. 14 as a frame format, as for the control bit alignment, the head of the bit alignment is made the address 0 of the pool configuring LDEV 11071 and, after that, the control bits are set in order of addresses. The case where the control bit is 0 indicates that the location of the address in this pool configuring LDEV 11071 (storage area) is not mapped to any virtual LDEV 191, that is, that [the address] can be newly assigned to a virtual LDEV 191. Meanwhile, the case where the control bit is 1 indicates that the block is already mapped to a virtual LDEV 191.

In the example of FIG. 14, if the pool configuring LDEV number 11071 is 02:01, the areas of addresses 0 and 1 are already mapped to virtual LDEVs, and the area of address 2 is not mapped to the virtual LDEV.

The LU management table 1103, the virtual LDEV management table 1104, the pool management table 1105, the mapping management table 1106, and the pool configuring LDEV management table 1107 are stored in a memory accessible from the channel command control unit 110, for example, the shared memory 15 or a memory 113 which is a local memory installed in the channel board 11 configuring the channel control unit 110.

Actual Storage Area Assignment Processing for Accesses from Host Device 2

Figure 15:
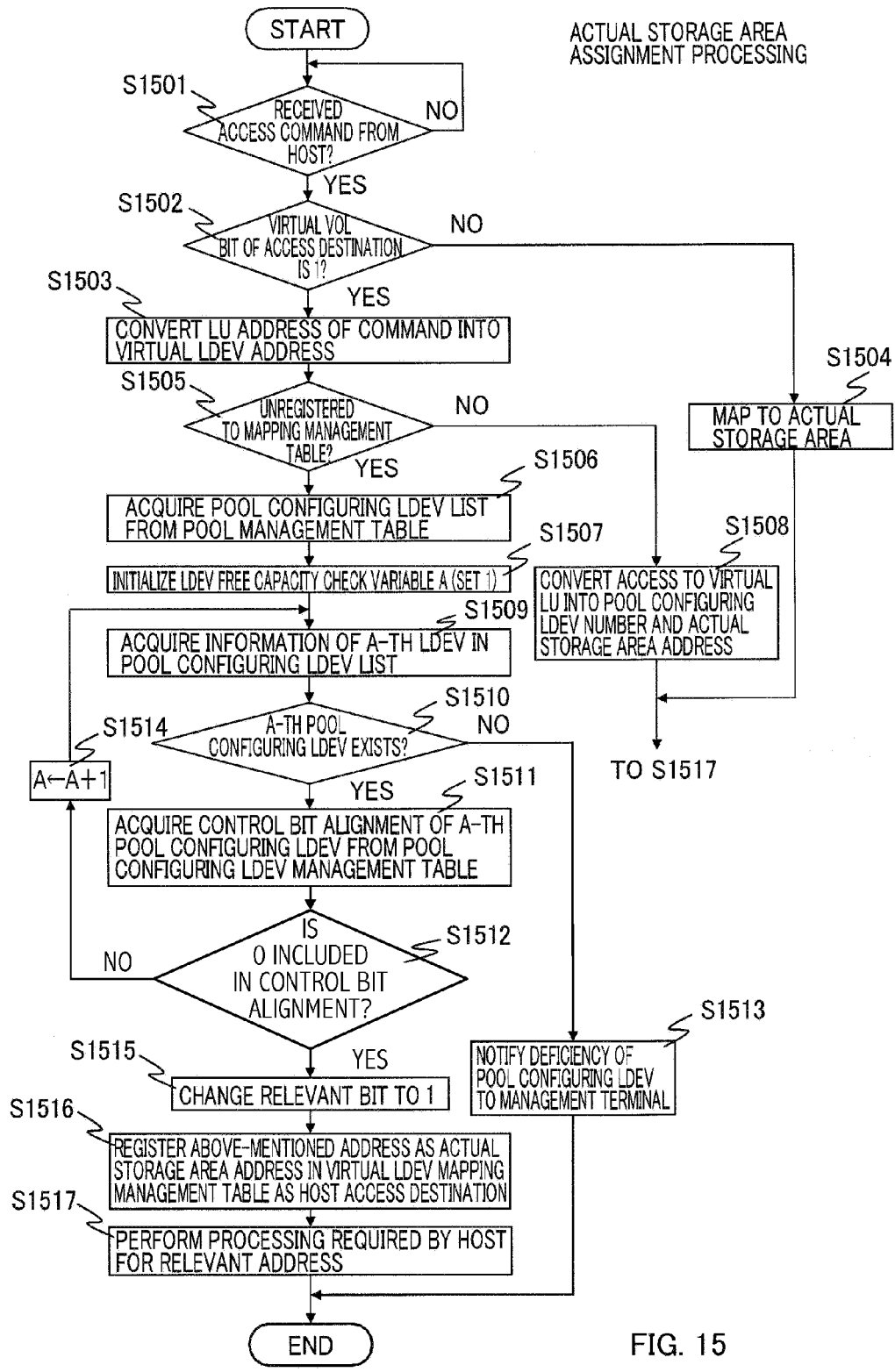
FIG. 15 is an example of the processing flow of an actual storage area assignment processing.

Next, the actual storage area assignment processing performed in the storage apparatus 10 if an access (data I/O request) is issued from the host device 2 to the storage apparatus 10 including a virtual LU 192 is described. FIG. 15 shows an example of the processing flow of this actual storage area assignment processing.

The channel command control unit 1102 installed in the storage apparatus 10 waits for the reception of an access command (data I/O request) from the host device 2 (S1501, No) and, if receiving one (S1501, Yes), with reference to the LU management table 1103, determines whether the virtual volume bit 11034 of the access target LU 174 identified by a LUN 11032 included in the command is 1 or not (S1502). If determining that the virtual volume bit 11034 is not 1 (S1502, No), the channel command control unit 1102 maps the LU to the actual storage area assigned to the actual LDEV 172 identified by the LU management table 1103 (S1504).

If determining that the virtual volume bit 11034 for the LUN 11032 included in the command received from the host device 2 is 1 (S1502, Yes), the channel command control unit 1102, with reference to the LU management table 1103, converts the relevant LUN 11032 into an LDEV number 11033 (S1503).

Then, the channel command control unit 1102 determines whether this LDEV number 11033 is nonregistered in the mapping management table 1106 or not (S1505). If determining that the number is already registered (S1505, No), the channel command control unit 1102, with reference to the virtual LDEV management table 1104, the pool management table 1105, and the mapping management table 1106, makes the number correspond to the actual storage area address 11065, and performs the access processing from the host device 2 for the relevant actual storage area (S1508).

If determining that the relevant virtual LDEV 191 is nonregistered in the mapping management table 1106 (S1505, Yes), the channel command control unit 1102 acquires the pool configuring LDEV list 11052 identified by the pool number 11042 corresponding to the virtual LDEV number 11041 registered in the pool management table 1105 (S1506).

Next, the channel command control unit 1102 performs the initialization processing in which 1 is set as the LDEV free capacity check variable A (A is assumed to be an integer which is 1 or larger) which is the variable set for checking whether a virtual LDEV number 11033 corresponding to the access from the host device 2 exists or not in an arbitrary local register and others (S1507), and refers to the information of the LDEV 172 recorded as the A-th item in the pool configuring LDEV list 11052 (S1509). The channel command control unit 1102 determines whether the required A-th pool configuring LDEV 11071 exists or not (S1510) and, if determining the pool configuring LDEV does not exist (S1510, No), as the pool configuring LDEV 11071 which can be assigned to the access request is lacking, notifies the management device 3 of the deficiency of the pool configuring LDEV 11071 (S1513).

If the pool configuring LDEV number 11071 is determined to be available (S1510, Yes), the channel command control unit 1102, with reference to the pool configuring LDEV management table 1107, acquires a control bit alignment corresponding to the pool configuring LDEV number 11071 which is available (S1511), and determines whether 0 is included in the acquired control bit alignment or not (S1512). If determining that 0 is not included in the control bit alignment (S1512, No), as no actual storage area (free capacity) that is available for the target pool configuring LDEV 11071 exists, the channel command control unit 1102 increments the LDEV free capacity check variable A by 1 (S1514), returns the processing to S1509, and acquires the information of the next pool configuring LDEV 11071.

If determining that 0 is included in the control bit alignment (S1512, Yes), the channel command control unit 1102 changes the value of the relevant control bit in which 0 is recorded to 1 (S1515) and, for the virtual LDEV 191 corresponding to the access destination virtual LU 192 in the host device 2 recorded in the mapping management table 1106, registers (maps) the page number 11062, the virtual LDEV address 11063, and the pool configuring LDEV number 11064 corresponding to the assigned actual storage area address 11065 (S1516). Then, for the assigned actual storage area, the channel command control unit 1102 performs the processing specified by the command of the host device 2 (read, write, or others) (S1517).

As described above, by the Thin Provisioning function, the configuration in which the actual storage area is assigned if the virtual LU 192 is actually accessed by the host device 2 can be achieved, which can inhibit the storage capacity to be installed in the storage apparatus 10 in advance.

Assigned Actual Storage Area Discard Processing

Figure 16:
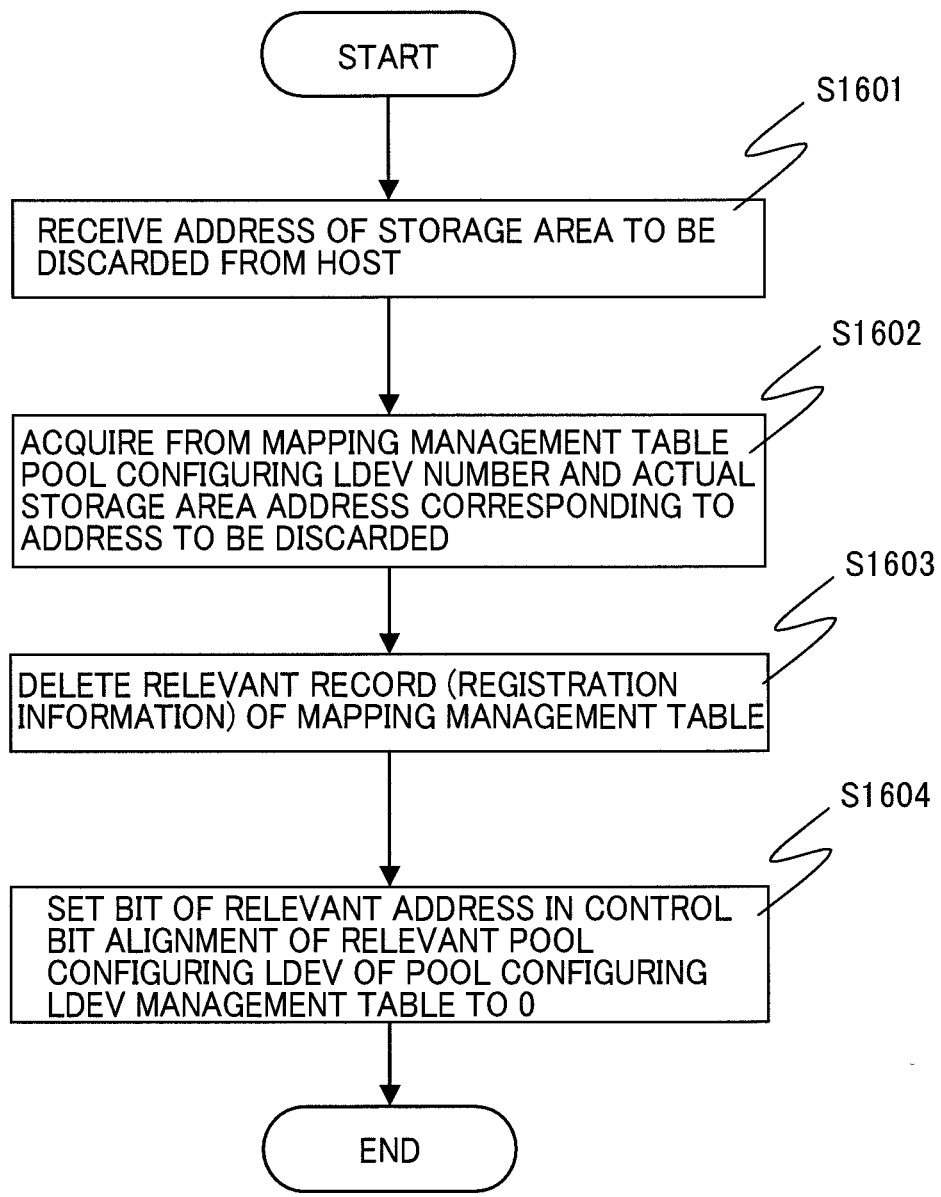
FIG. 16 is an example of the flow of a page discard processing.

Next, the processing for returning the actual storage area which is assigned to the virtual LU 192 by the above-mentioned method to the unassigned area again is described. Hereinafter, this processing is referred to as a page discard processing. FIG. 16 shows an example of the page discard processing flow.

This page discard processing is realized by deleting a corresponding record which is recorded about the actual storage area once assigned to the virtual LU 192 in the mapping management table 1106. This page discard processing is performed by the channel command control unit 1102 installed in the channel control unit 110.

Firstly, the channel command control unit 1102, among the actual storage area addresses (pages) included in the virtual volume 190 to which the actual storage area is already assigned, receives the discard target page from the host device 2 (S1601). That is, for example, the user of the storage system 1 transmits a command including the information which identifies the discard target page from the host device 2 to the channel control unit 110. The channel command control unit 1102 of the channel control unit 110, receiving the command, acquires a pool configuring LDEV number 11064 and an actual storage area address 11065 corresponding to the page in the virtual volume 190 from the mapping management table 1106 (S1602).

Then, the channel command control unit 1102, from the mapping management table 1106, deletes the record including the information of the page number 11062, the virtual volume address 11063, the pool configuring LDEV number 11064, and the actual storage area address 11065 which correspond (S1603). The channel command control unit 1102, in the pool configuring LDEV management table 1107, for the target pool configuring LDEV 11071, changes the control bit alignment of the address corresponding to the virtual LDEV 11061 to 0 (S1604).

By the above-mentioned configuration, the assignment of the virtual volume 190 to the pool configuring LDEV 11064 (actual storage area) is discarded, and the host device 2 can utilize the actual storage area efficiently.

Page Discard Processing in Cases Where Copy Pair is Configured

Next, the page discard processing in cases where two logical volumes, a primary volume and a secondary volume, configure a copy pair is described. At this point, a copy pair indicates a pair configuration of logical volumes created by combining a secondary volume specified as the copy destination of the data stored in the primary volume. Hereinafter, three cases are sequentially described, which are the local copy configuration in which a copy pair is configured in one unit of storage apparatus 10, the remote copy configuration in which a copy pair is configured in at least two different storage apparatuses 10, and the remote copy configuration to which primary and secondary journal volumes are added for further recreating the order of writing data from the primary volume to the secondary volume.

Note that, as the page discard processing of this embodiment changes the contents of the processing depending on the status of the copy pair, the description is made by classifying each of the above-mentioned cases of copy pair configuration into the pair status and the suspend status.

The pair status is the status in which the differential data between the primary volume and the secondary volume configuring the copy pair is regularly copied from the primary volume to the secondary volume. In the pair status, as the host device 2 can perform data write to the primary volume only, difference occurs between the data stored in the primary volume and the secondary volume. This difference is eliminated by regular data copy from the primary volume to the secondary volume. This data copy may also be performed each time data is written from the host device 2 to the primary volume.

The suspend status is the status in which the pair of the primary volume and the secondary volume configuring the copy pair is split, the processing for synchronizing the primary and secondary volumes by regular differential copy is not performed, and the host device 2 can also perform data write to the secondary volume. If the storage apparatus 10 receives a resync command from the host device 2 in this status, the differential data is copied from the primary volume to the secondary volume in the storage apparatus 10, which makes the data stored in the primary volume and in the secondary volume consistent, and the copy pair status is also changed from the suspend status to the pair status.

Page Discard Processing in Local Pair (Pair Status)

In the page discard processing at this point, when performing the data copy processing from the primary volume to the secondary volume configuring a copy pair of local copy, by setting the page discard information, the page discard processing is performed.

Figure 17:
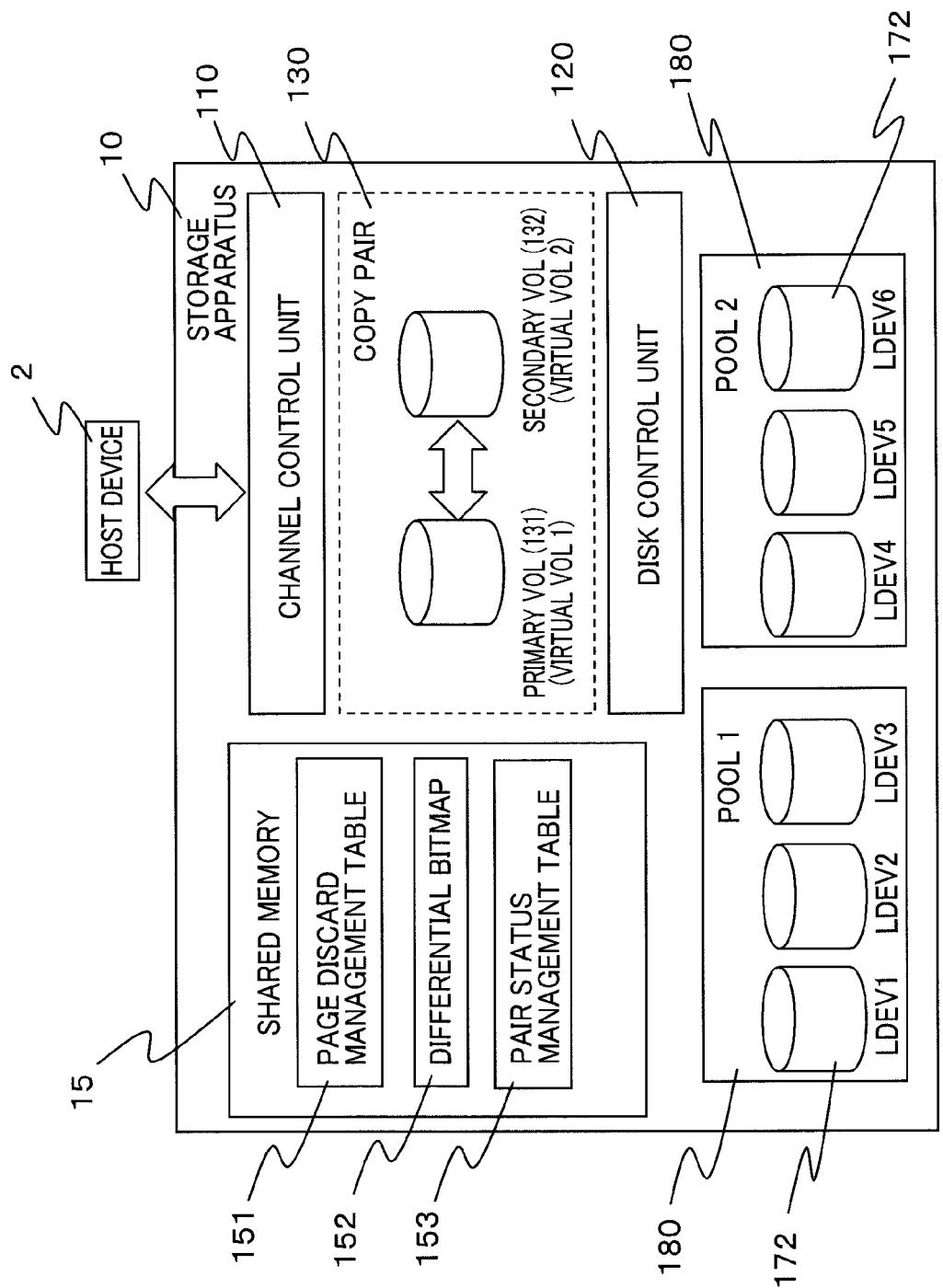
FIG. 17 is a schematic diagram showing the configuration of the storage system 1 in Embodiment 1.

An example of the storage apparatus 10 including the local copy configuration in this embodiment is shown as a schematic diagram in FIG. 17. As described in FIG. 1 to FIG. 8, the storage apparatus 10 includes the channel control unit 110 and the disk control unit 120, and receives commands from the host device 2 by the channel control unit 110. The data copy processing between the primary volume and the secondary volume configuring the local copy pair is managed by the channel command control unit 1102 of the channel control unit 110. In the pool area 180, for assigning a page which is an actual storage area to the virtual LDEV 191, actual LDEVs 172 are created. At this point, each actual LDEV 172 is also a pool configuring LDEV.

The shared memory 15 holds a group of management tables utilized by the channel command control unit 1102 for performing the page discard processing in this embodiment, which are a page discard management table 151, a differential bitmap 152, and a pair status management table 153.

Page Discard Command 1800

Figure 18:
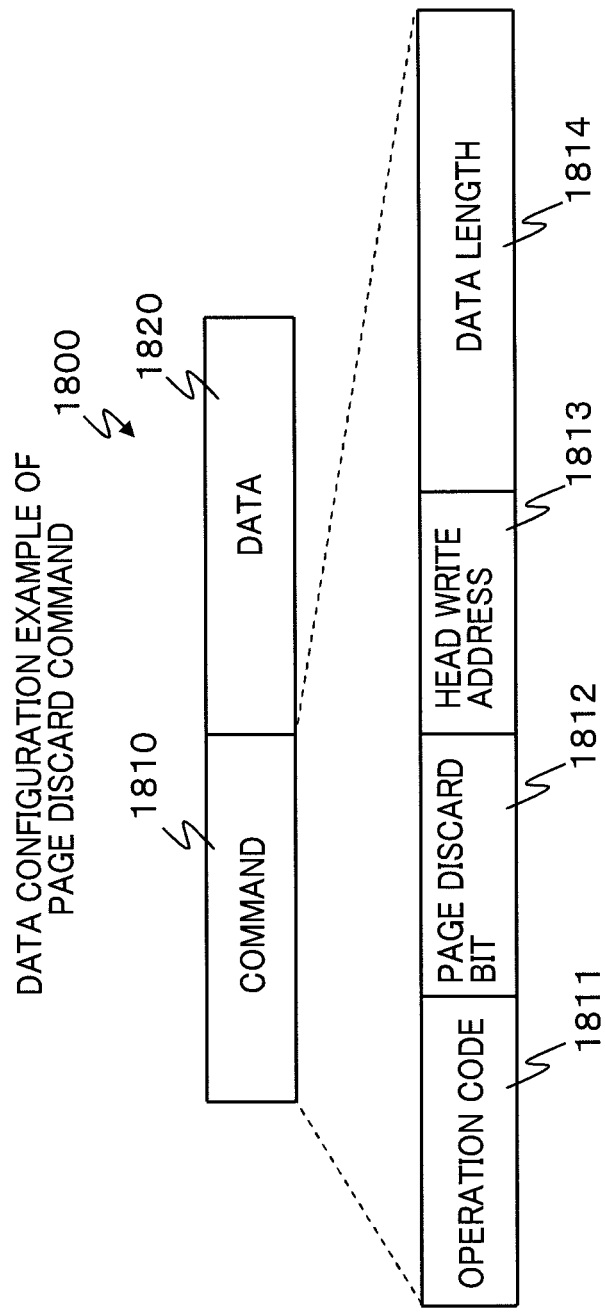
FIG. 18 is an example of the data configuration of a page discard command 1800.

In this embodiment, the user of the storage system 1 or others issues a page discard command including the address of a page which became unnecessary from the host device 2 to the primary volume (virtual VOL 1) 131. FIG. 18 shows an example of the data configuration of the page discard command 1800. The page discard command 1800 includes a command unit 1810 in which the contents of the command are recorded and a data unit 1820 in which the data to be processed by the command is stored.

The command unit 1810 includes an operation code 1811, a page discard bit 1812, a head write address 1813, and a data length 1814.

The operation code 1811 is a code indicating the type of the command desired to make the processors 112 or 122 of the channel control unit 110 or the disk control unit 120 which is the receiving side perform. As the page discard bit 1812, 1 is recorded if the page is discarded for the command while 0 is recorded if the page is not discarded, which distinguishes the page discard command from ordinary data write commands and others. The head write address 1813 indicates the head address for performing the write processing. As the data length 1814, the data length for writing the contents of the data which is recorded from the head write address 1813 in the data unit 1820 is recorded.

Differential Bitmap 1900 (152)

Figure 19:
FIG. 19 is an example of a differential bitmap 1900.

FIG. 19 shows an example of a differential bitmap 1900. The differential bitmap 1900 in FIG. 19 shows the case where slots (size: 512 bytes, for example) are adopted as the minimum data storage areas of the primary volume 131 and the secondary volume 132, and a slot number 1901, a primary volume differential bit 1902, and a secondary volume differential bit 1903 are made to correspond to each other and recorded. The case where 1 is recorded in the primary volume differential bit 1902 or the secondary volume differential bit 1903, for the slot identified by the corresponding slot number 1901, indicates that difference occurs in the data between the primary and secondary volumes.

The unit of differential management by the differential bitmap 1900 is determined based on the trade-off between the resolution performance and the capacity of the management table. If the difference is managed by the minimum storage area unit called a slot, the resolution performance can be improved and the usage efficiency of the storage area can be improved while, if a larger storage area unit such as a cylinder is used, although the resolution performance is deteriorated, the capacity of the management table can be reduced. In this embodiment, a page which is the unit of the actual storage area is configured of multiple slots (this is also applied to the cases below).

Page Discard Management Table 2000 (151)

Figure 20A:
FIG. 20A is an example of a page discard management table 2000 in units of pages.
Figure 20B:
FIG. 20B is an example of a page discard management table 2000 in units of LDEVs.

FIG. 20A and FIG. 20B show an example of the page discard management table 2000 in this embodiment. The page discard management table 2000 is utilized for identifying the target storage area for which the page discard processing is performed. In the page discard management table 2000, a page number 2001 (recorded in FIG. 20A with the logical control unit number CU # and the LDEV number LDEV # as CU #: LDEV #: page #) or a virtual LDEV number 2001 (recorded in FIG. 20B with the logical control unit number CU # as CU #: LDEV #) and a page discard bit 2002 are made to correspond to each other and recorded. For the storage area (page, LDEV 2001 or others) whose page discard bit 2002 is 1, it is indicated that the page discard processing described later is performed.

Page Discard Processing

Figure 21:
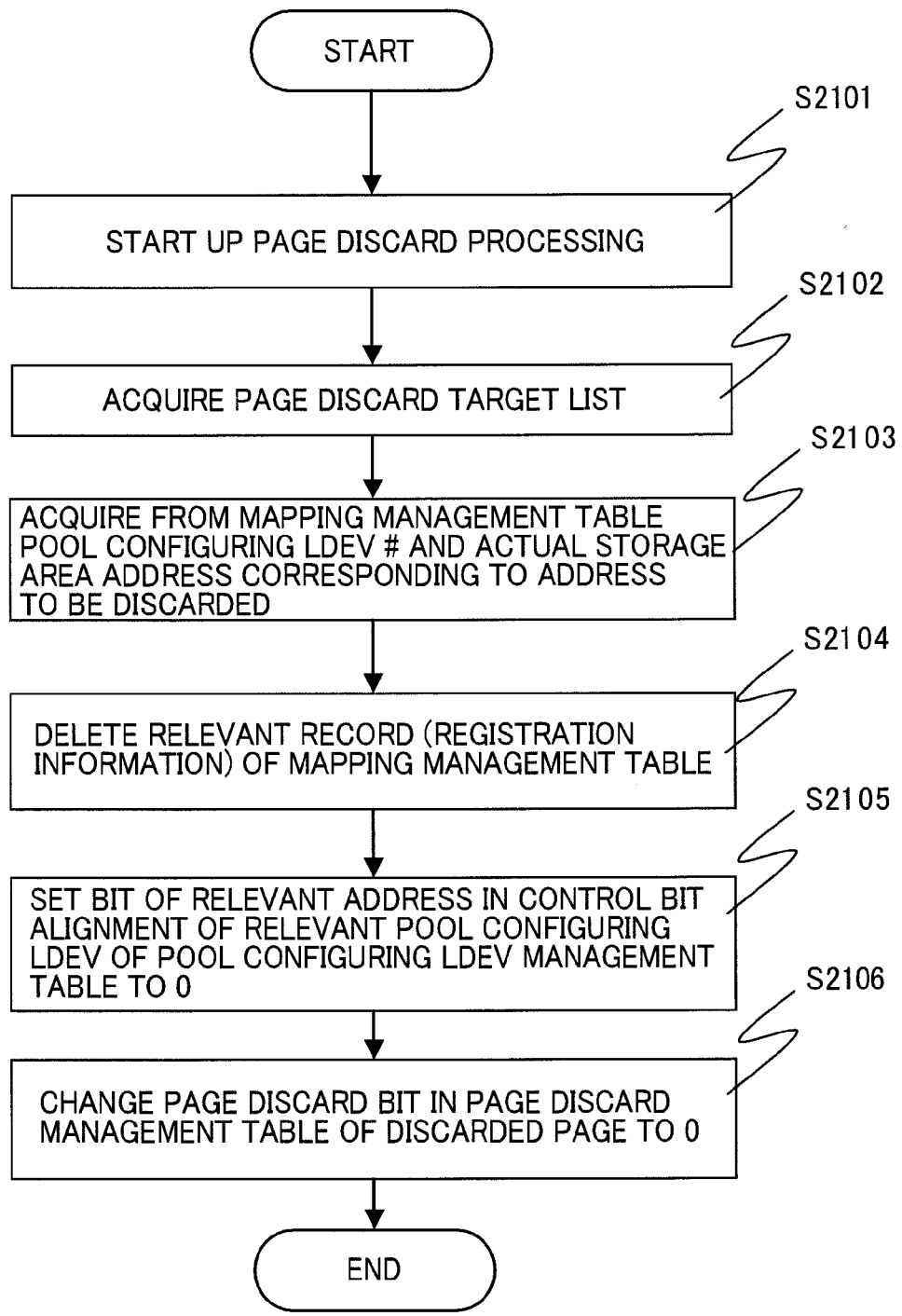
FIG. 21 is an example of the flow of the page discard processing.

FIG. 21 shows an example of the page discard processing flow. This page discard processing is the processing performed by the primary volume 131 and the secondary volume 132 which received a page discard request from the host device 2, and is performed in the page discard processing in common to the respective types of copy pair configuration. The program which performs the page discard processing is, for example, stored in the shared memory 15, and is performed by the channel command control unit 1102 which accepted a page discard request from the host device 2.

The page discard processing is performed asynchronously from data I/O requests from the host device 2.

If the page discard processing is started up by the channel command control unit 1102 (S2101), the channel command control unit 1102 acquires a list of the discard target pages (in case of other management units, LDEVs 172 or in other units) from the received command (S2102). The channel command control unit 1102 of the channel control unit 110, receiving the command, from the mapping management table 1106, for the discard target pages, acquires the pool configuring LDEV numbers 11064 and the actual storage area addresses 11065 which correspond to the pages in the virtual volume 190 (S2103).

Then, the channel command control unit 1102, from the mapping management table 1106, deletes the records including the information of the page number 11062, the virtual volume addresses 11063, the pool configuring LDEVs 11064, and the actual storage area addresses 11065 which correspond (S2104). The channel command control unit 1102, in the pool configuring LDEV management table 1107, for the target pool configuring LDEV 11071, changes the bit of the control bit alignment of the address corresponding to the virtual LDEV 11061 to 0 (S2105).

Finally, the channel command control unit 1102, for the discarded pages, changes the page discard bit 2002 of the page discard management table 2000 to 0, and completes the processing (S2106).

By the above-mentioned configuration, for the primary volume 131 and the secondary volume 132, the pages specified by the host device 2 can be discarded.

Pair Status Management Table 2200

FIG. 22 shows an example of the pair status management table 2200 in this embodiment. The pair status management table 2200 indicates the correspondence relationship between the primary volume 131 and the secondary volume 132 configuring a copy pair, and a primary volume slot number 2201, a secondary volume slot number 2202, and a pair status 2203 are made to correspond to each other and recorded. It is indicated that the data stored in the storage area identified by the primary volume slot number 2201 is copied to the storage area identified by the corresponding secondary volume slot number 2202. Furthermore, for each correspondence relationship of the primary volume slot number 2201 and the secondary volume slot number 2202, whether the pair status is "pair" or "suspend" is recorded in the pair status 2203. The pair status is managed for each slot, and each slot is identified by the combination of a logical control unit number, an LDEV number, and a slot number (CU #: LDEV #: slot #).

Page Discard Processing Flow in Local Copy Configuration (Pair Status)

Figure 23:
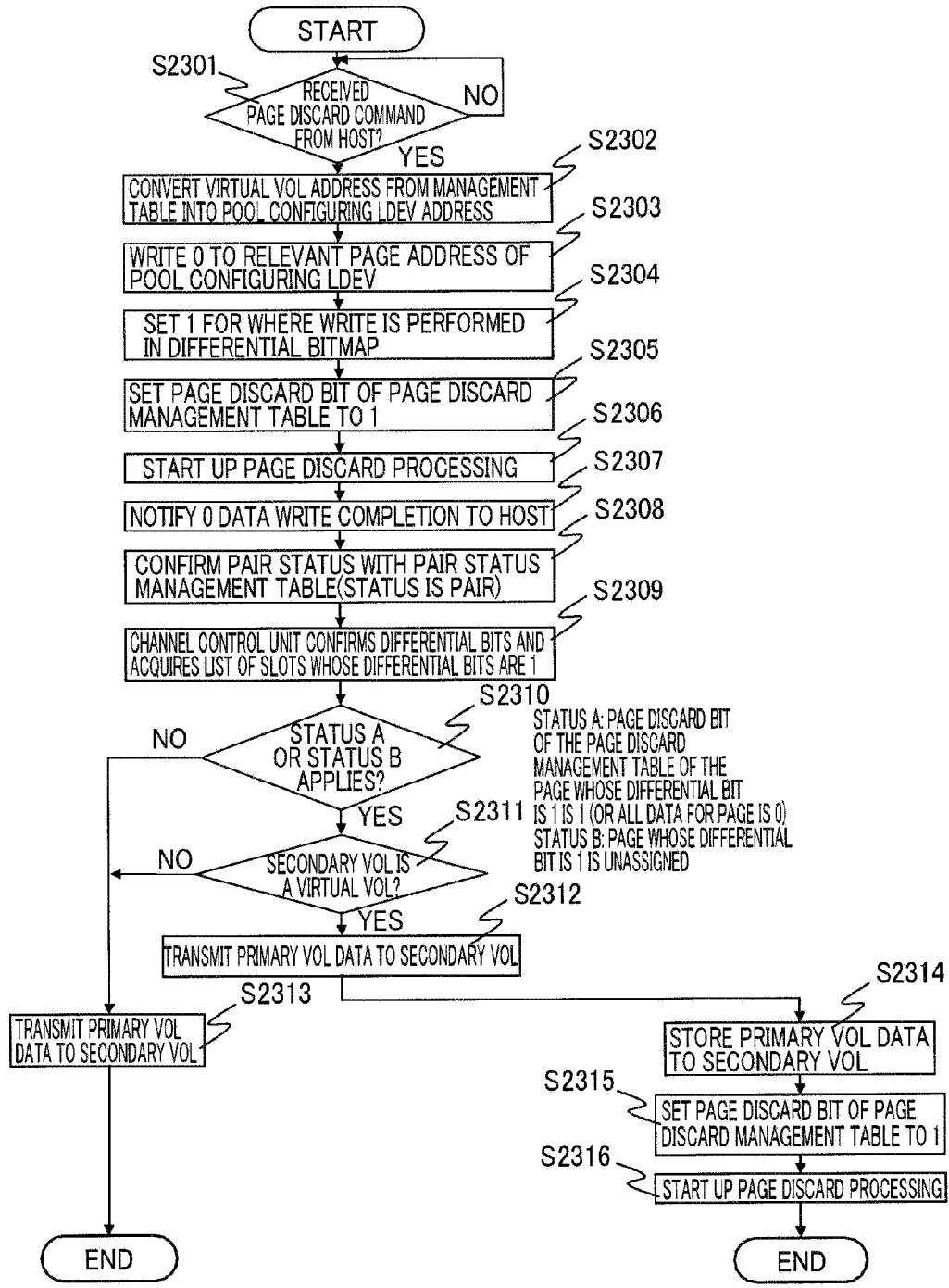
FIG. 23 is an example of the flow of the page discard processing in the local copy configuration (pair status).

In view of the above-mentioned configuration, the page discard processing flow in the local copy configuration (pair status) is described. FIG. 23 shows an example of the relevant processing flow.

Firstly, the channel command control unit 1102 installed in the channel control unit 110 managing the primary volume 131 waits for the reception of a page discard command from the host device 2 (S2301, No). The page discard command issued by the host device 2 is received by the channel command control unit 1102 of the channel control unit 110 (S2301, Yes), through the LU management table 1103, the virtual LDEV management table 1104, the pool management table 1105, and the mapping management table 1106, the channel command control unit 1102 acquires the address of the pool configuring LDEV 11064 in the pool area 180 corresponding to the page number 11062 specified by the command (S2302).

The channel command control unit 1102 issues an instruction to the acquired address for writing zero data to the disk control unit 120, and the disk control unit 120 writes zero data to an actual LDEV 172 (S2303).

As zero data is written to the primary volume 131, data difference occurs between the primary volume 131 and the secondary volume 132. Therefore, the channel command control unit 1102, in the differential bitmap 1900, sets 1 for the primary volume differential bit 1902 of the location where zero data write was performed (S2304).

Next, the channel command control unit 1102 sets the page discard bit 2002 for the corresponding page 2001 of the page discard management table 2000 in the shared memory 15 to 1 (S2305).

Next, the channel command control unit 1102 starts up the page discard processing shown in FIG. 21 (S2306), discards the page of the primary volume and, at that point of time, notifies the host device 2 of the zero data write completion (S2307).

Next, the channel command control unit 1102, in the pair status management table 2200 in the shared memory 15, confirms the pair status of the relevant slot address (S2308). FIG. 23 shows the processing in cases where the pair status of the relevant slot is "pair." If the pair status 2203 in the pair status management table 2200 is "pair," differential data is regularly copied from the primary volume to the secondary volume.

The channel command control unit 1102, with reference to the differential bitmap 1900 in the shared memory 15, acquires a list of slots for which either one or both of the primary volume differential bit 1902 and the secondary volume differential bit 1903 is set to 1 (S2309). Then, the channel command control unit 1102, with reference to the mapping management table 1106, determines, to the address corresponding to the slots recorded in the list, whether the condition of either the status A or the status B described below from the page discard management table 2000 applies or not (S2310).

Status A: For the page for which either one or both of the primary volume differential bit 1902 and the secondary volume differential bit 1903 of the differential bitmap 1900 is set to 1, the corresponding page discard bit 2002 of the page discard management table 2000 is 1 or all the data for the relevant page is zero.

Status B: In the differential bitmap 1900, the page for which either one or both of the primary volume differential bit 1902 and the secondary volume differential bit 1903 is set to 1 is unassigned.

The status B indicates that, in the mapping management table 1106, no page including the address of which either the primary volume differential bit 1902 or the secondary volume differential bit 1903 corresponds to the slot 1 exists. That is, the status B indicates that the page discard processing is completed and that the page is already discarded.

If determining at S2310 that neither the status A nor the status B applies (S2310, No), as no page as the page discard target exists, the channel command control unit 1102 transmits the data stored in the primary volume 131 to the secondary volume 132, and completes the processing (S2313).

If determining at S2310 that the status A or the status B applies (S2310, Yes), the channel command control unit 1102 searches the pair status management table 2200 or the LU management table 1103, the virtual LDEV management table 1104, the pool management table 1105, the mapping management table 1106, and the pool configuring LDEV management table 1107, and determines whether the secondary volume 132 corresponding to the primary volume 131 is a virtual volume 190 or not (S2311).

If determining that the secondary volume 132 is not a virtual volume 190 (S2311, No), as the secondary volume 132 has no page to be discarded, the channel command control unit 1102 transmits the data of the primary volume 131 to the secondary volume 132, and completes the processing (S2313). If determining that the secondary volume 132 is a virtual volume 190 (S2311, Yes), firstly, the zero data is copied between the corresponding slots 1901 from the primary volume 131 to the secondary volume 132 (S2312).

In the secondary volume 132, the zero data received from the primary volume 131 is stored in the relevant slot 1901 (S2314). Then, after the completion of the copy, the channel command control unit 1102 managing the secondary volume 132 sets the page discard bit 2002 of the page discard management table 2000 corresponding to the page 2001 to which the zero data of the secondary volume 132 is copied to 1 (S2315), and starts up the page discard processing shown in FIG. 21 (S2316). After this, through the page discard processing, the page corresponding to the primary volume 131 of the secondary volume 132 is also discarded.

Note that, as for data transfer from the primary volume 131 to the secondary volume 132, as well as the method of transferring all the zero data for the data length as described in this embodiment, the method of transferring only the minimum capacity unit of zero data and, if the page discard bit 2002 is 1, repeatedly writing zero data for the data length from the head write address by the channel command control unit 1102 of the secondary volume 132 or the method of, without transferring zero data from the primary volume 131, if the page deletion bit 2002 is 1, repeatedly writing zero data for the data length from the head write address by the channel command control unit 1102 of the secondary volume 132 may also be adopted.

Furthermore, as for the transmission of the discard target pages from the primary volume 131 to the secondary volume 132, it is also possible to adopt the method in which, at the time of receiving the page discard command from the host device 2 to the primary volume 131, the channel command control unit 1102 of the primary volume 131 ascertains the pages of the corresponding secondary volume 132 from the pair status management table 2200 and others, manages the same as the secondary volume page discard information in the memory 113 and others and, at the time of data copy from the primary volume 131 to the secondary volume 132, with reference to this secondary volume page deletion information, sets the page discard bit 2002.

By the above-mentioned configuration, the pages stored corresponding to both the primary volume 131 and the secondary volume 132 can be discarded by one page discard command from the host device 2.

Page Discard Processing Flow in Local Copy Configuration (Suspend Status)

Figure 24:
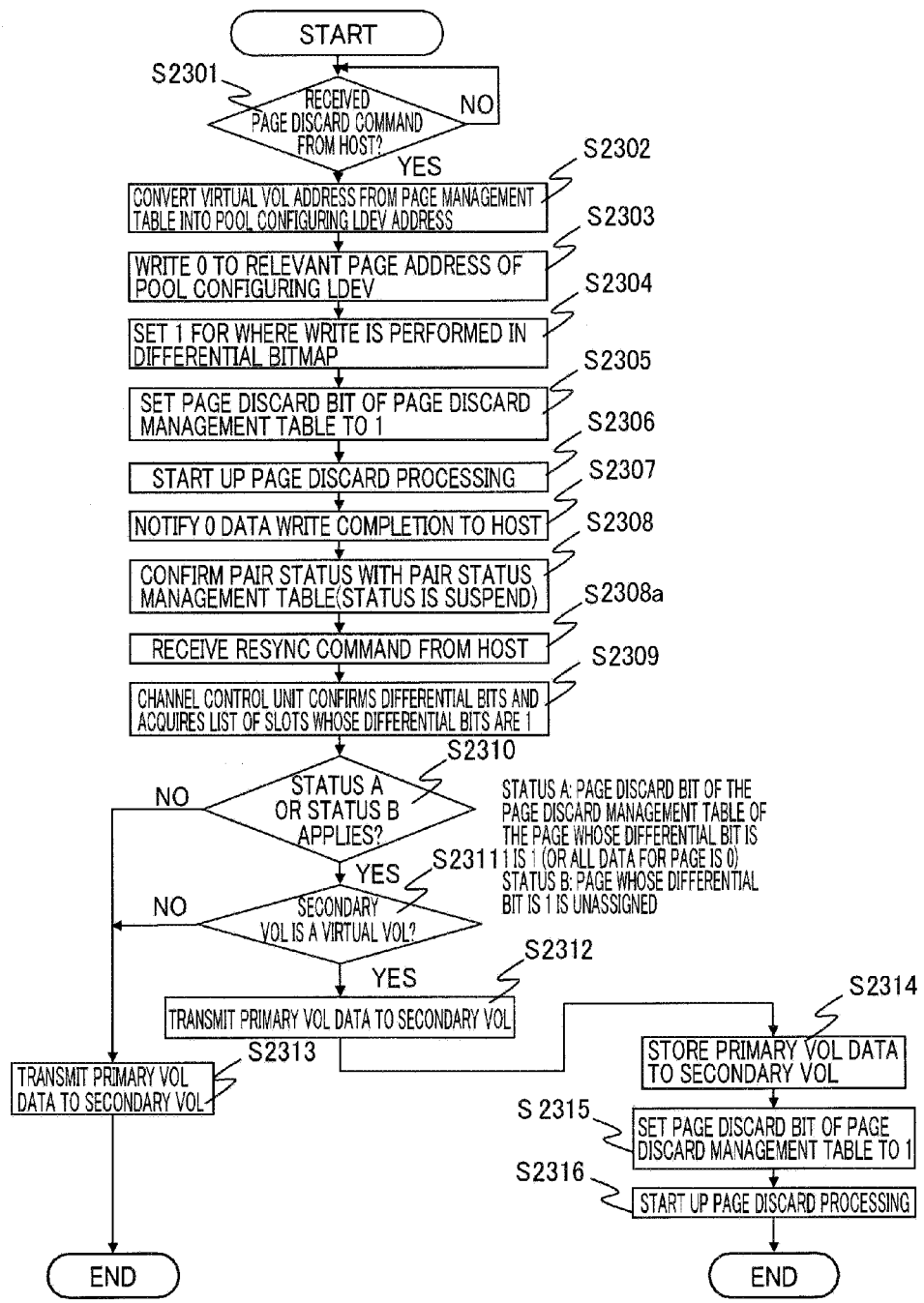
FIG. 24 is an example of the flow of the page discard processing in the local copy configuration (suspend status).

Next, the processing in the local copy configuration in cases where the pair status is suspend is described. FIG. 24 shows an example of the page discard processing flow in the local copy configuration in the suspend status. As the page discard processing flow in the suspend status shown in FIG. 24 is nearly the same as the processing flow in the pair status shown in FIG. 23, the same reference signs are provided to the corresponding steps. The difference from the cases of the pair status is that, at the step S2308a in. FIG. 24, the channel command control unit 1102 accepts a resync command from the host device 2.

As described above, in the local copy pair in the suspend status, the regular differential copy from the primary volume 131 to the secondary volume 132 is not performed. Therefore, the channel command control unit 1102 managing the primary volume 131 is supposed to accept a resync command from the host device 2 and perform differential copy from the primary volume 131 to the secondary volume 132. After this, the primary volume 131 and the secondary volume 132 configuring the local copy pair are supposed to be in the pair status and continue to operate.

As described above, in the page discard method described in the local copy configuration, after a page discard command is issued from the host device 2, the channel command control unit 1102 writes zero data to the relevant page of the primary volume 131 and, at the time of resynchronizing the primary and secondary volumes (differential copy) after starting up the page discard processing for the primary volume 131, determines whether it is necessary to transmit a page discard processing command to the secondary volume 132 or not. The channel command control unit 1102, at the time of accepting a page discard command from the host device 2, may also create the page discard information of the secondary volume 132, temporarily store the same in a memory or others, transmit the page discard information when reflecting the data from the primary volume 131 to the secondary volume 132 and, by that method, set the page discard bit of the secondary volume, although the determination whether the page to be copied at the differential copy is a discard target page or not as shown in this embodiment has the merit described below.

Figure 25:
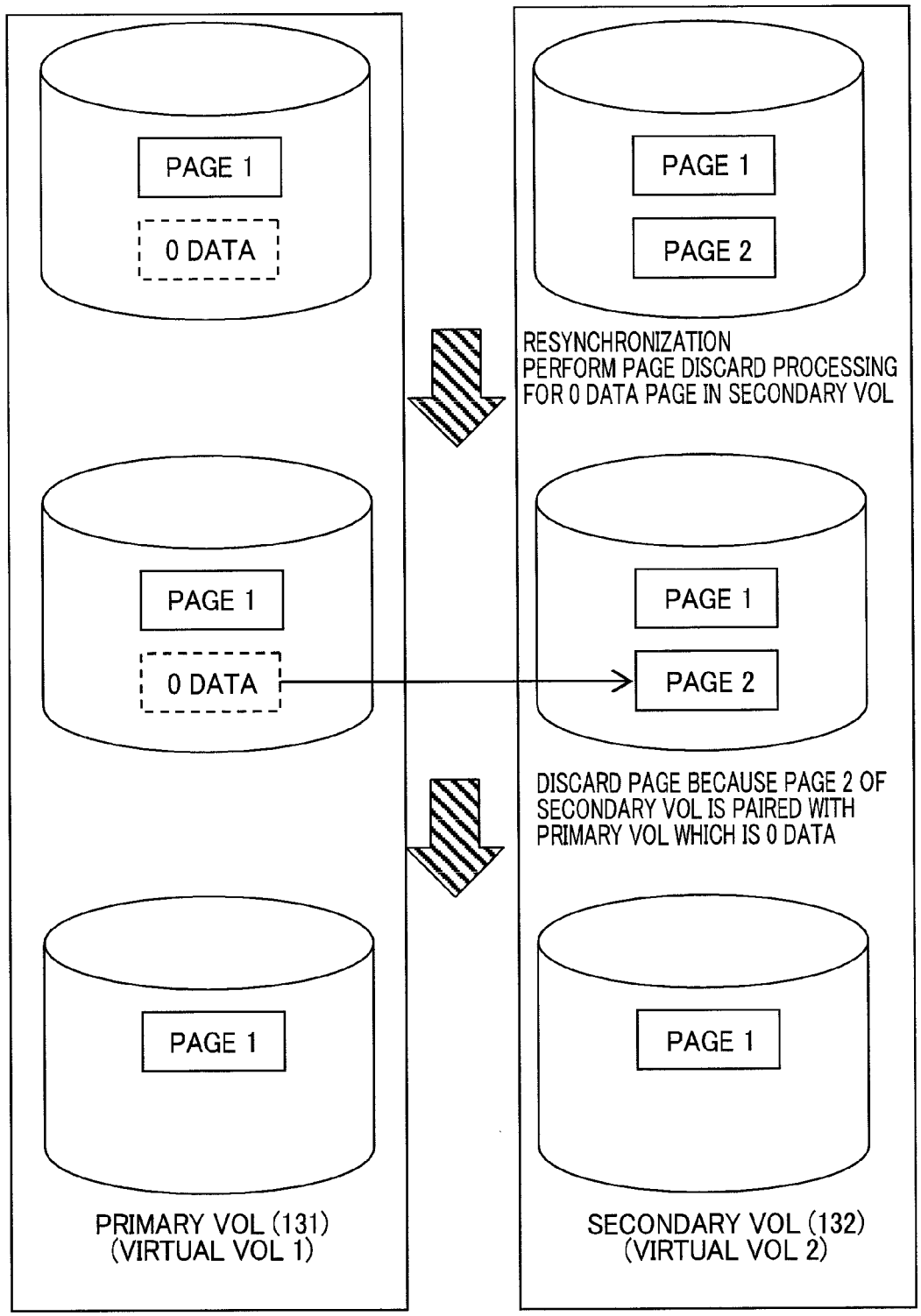
FIG. 25 is an explanatory diagram of the page discard processing in a case where a page is assigned to a secondary volume 132 only.

FIG. 25 shows an explanatory diagram of the page discard processing for cases where a page assigned to the secondary volume 132 only is included. In the suspend status in which the primary and secondary volumes 131, 132 of a copy pair are split, the host device 2 can write data to the secondary volume 132 directly. Therefore, it might occur that, while a page is not assigned to the virtual volume 190 in the primary volume 131, the page is assigned by the data write processing in the secondary volume 132.

In this case, if the channel command control unit 1102, at the time of accepting a page discard command, performs the discard processing by ascertaining the discard page address of the secondary volume 132 from the address of the discard target page included in the command, the page without a corresponding page in the primary volume 131 which is only assigned to the secondary volume 132 is supposed to be impossible to discard.

As shown in FIG. 25, in the configuration of this embodiment, in the differential bitmap 1900, if data is written to the secondary volume 132 from the host device 2, the differential bit 1903 of the secondary volume 132 is 1. Therefore, if data write is performed for the secondary volume 132 only and a page is assigned, as the secondary volume differential bit 1903 in the differential bitmap 1900 corresponding to the page is set to 1, the channel command control unit 1102 can detect the relevant page as the target of differential copy. Therefore, referring to the page in the primary volume 131 for performing differential copy from the primary volume 131 to the secondary volume 132, as all the data recorded in the relevant page is zero, the page in the secondary volume 132 is the discard target. Therefore, by the page discard processing method of this embodiment, even if a page is assigned only to the virtual volume 190 of the secondary volume 132, the page in the relevant secondary volume 132 can be discarded.

Embodiment 2

Page Discard Processing in Remote Copy Configuration

Next, the page discard processing in case of synchronous remote copy including the configuration in which the primary and secondary volumes 131, 132 configuring a copy pair belong to different storage apparatuses 10 respectively is described.

Figure 26:
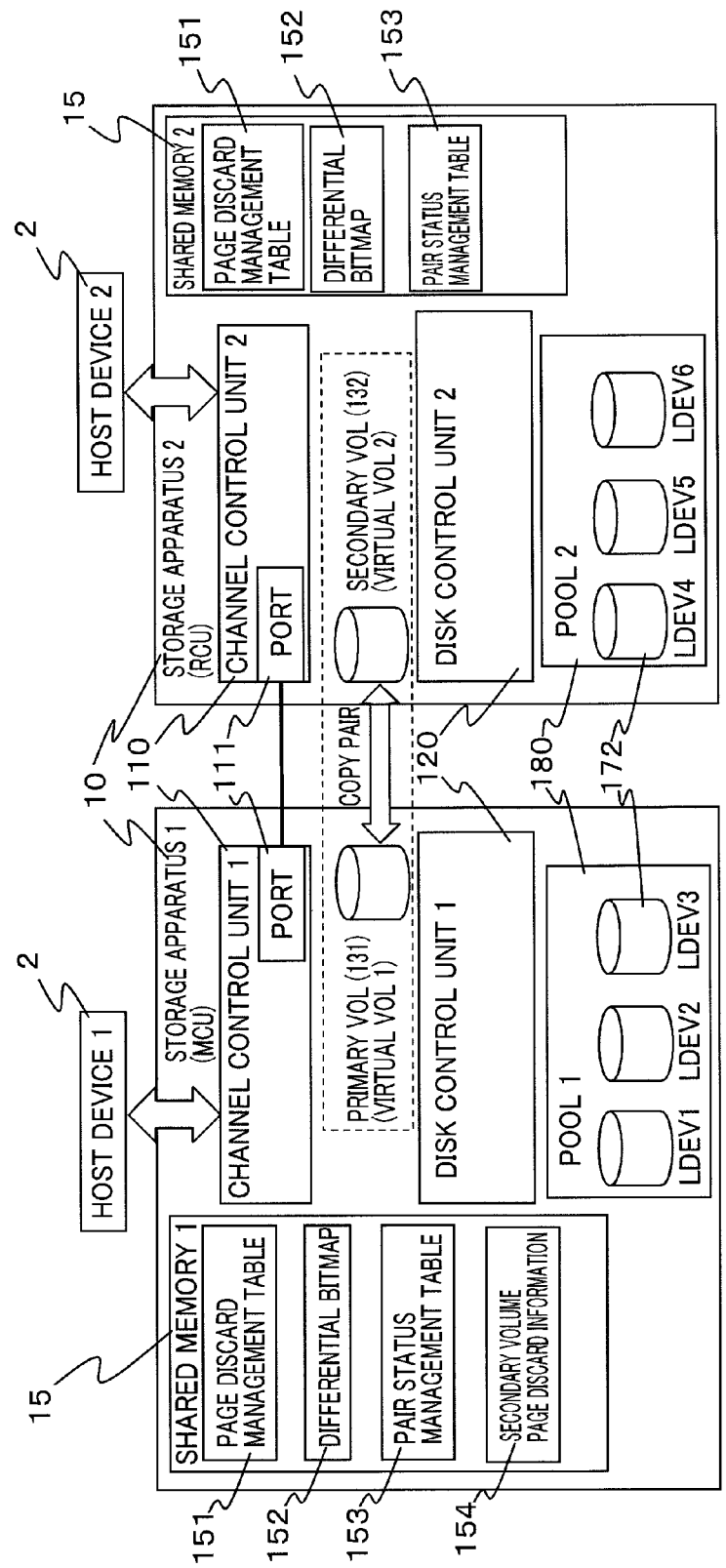
FIG. 26 is a schematic diagram showing the configuration of the storage system 1 in Embodiment 2.

FIG. 26 shows an example of the configuration of the storage system 1 including synchronous remote copy configuration. In FIG. 26, the configuration of each storage apparatus 10 is nearly the same as the case of local copy configuration shown in FIG. 17, although the storage apparatus 10 as the main control unit (MCU) and the storage apparatus 10 as the remote control unit (RCU) are connected as communicable by the channel control units 110 via the communication ports 111. As communication methods among communication ports 111, for example, LAN, SAN, the internet, a public telecommunication network and others can be utilized. By these communicable channel control units 110, the primary volume 131 created in the MCU and the secondary volume 132 created in the RCU configure a copy pair of the synchronous remote copy method.

Furthermore, in the shared memory 15 existing in each of the storage apparatuses 10 of the MCU and the RCU, a page discard management table 151, a differential bitmap 152, and a pair status management table 153 are held, and furthermore, in the shared memory 15 of the MCU, secondary volume page discard information 154 is held.

The LU management table 1103, the virtual LDEV management table 1104, the pool management table 1105, the mapping management table 1106, and the pool configuring LDEV management table 1107 stored in the memory 113 of the channel board 11 are the same as the case of the local copy configuration. Furthermore, similarly, the page discard management table 151 and the differential bitmap 152 held in the memory 113 or in the shared memory 15 of the channel board 11 also include the equal configuration to the case of the local copy configuration. Hereinafter, the pair status management table 2700 (153) and the secondary volume page discard information 2900 (154) with the differential configuration from the case of the local copy configuration are described.

Pair Status Management Table 2700 (153)

FIG. 27 shows an example of the configuration of the pair status management table 2700 in this embodiment. The pair status management table 2700 records the correspondence relationship of slots in which the corresponding data of the primary and secondary volumes 131, 132 configuring a synchronous remote copy pair is stored and the pair status between the slots, wherein respective items of a port number 2701 and a slot number (described as the style of CU #: LDEV #: slot # as the case of FIG. 22) 2702 in the channel board 11 of the storage apparatus 10 of the MCU, an apparatus number 2703 which is the apparatus identification sign of the storage apparatus 10 of the RCU, a port number 2704 and a slot number 2705 in the channel board 11, and a pair status 2706 between the corresponding slot numbers 2702 and 2705 are made to correspond to each other and recorded. By this pair status management table 2700, the channel command control unit 1102 switches the processing depending on the pair status and the suspend status.

Communication Message 2800 Between MCU and RCU

Figure 28:
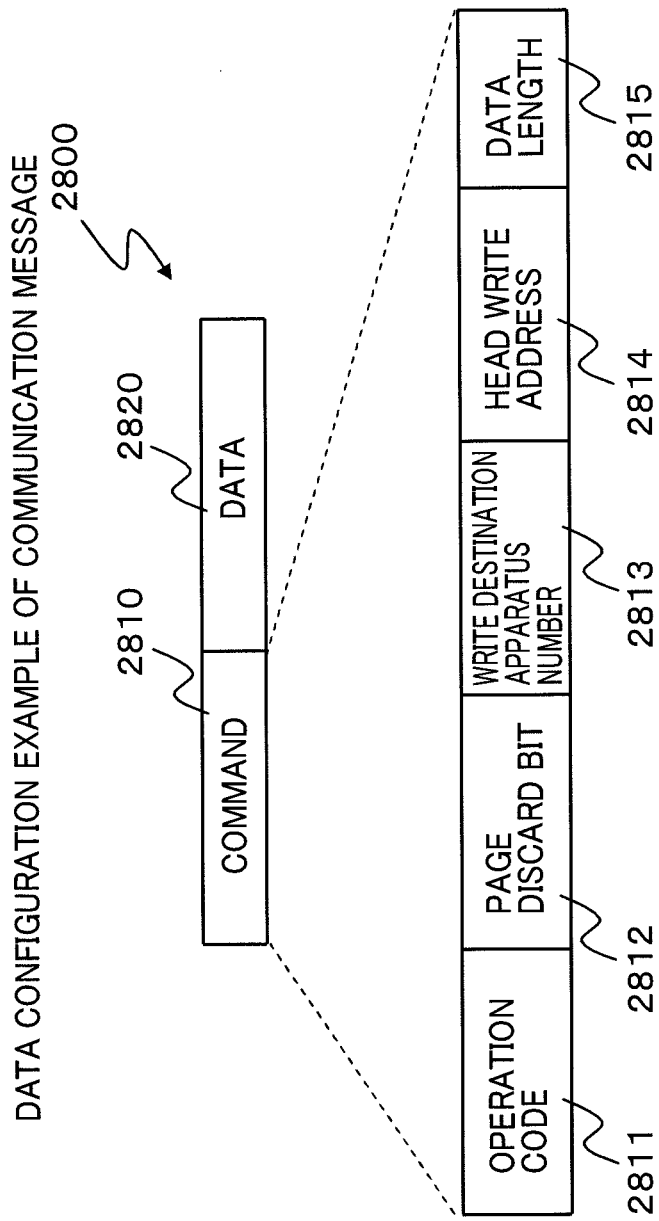
FIG. 28 is an example of the data configuration of a communication message 2800 in Embodiment 2.

In this embodiment, as the primary volume 131 and the secondary volume 132 belong to the different storage apparatuses 10 respectively, from the channel control unit 110 in the storage apparatus 10 of the MCU to the channel control unit 110 in the storage apparatus 10 of the RCU, a communication message 2800 which is equivalent to a page discard command from the host device 2 is transmitted. FIG. 28 shows an example of the data configuration of this communication message 2800. The communication message 2800 includes a command unit 2810 in which the contents of the command are recorded and a data unit 2820 in which the data to be processed by the command is stored. The configuration of the respective [units] is equal to the page discard command 1800 shown in FIG. 18 except the difference that, in the command unit 2810, in addition to an operation code 2811, a page discard bit 2812, a head write address 2814, and a data length 2815, a write destination apparatus number 2813 is also recorded. For the write destination apparatus number 2813, the write destination of the data from the storage apparatus 10 of the MCU is recorded by an apparatus number (equivalent to the apparatus number 2703 in the pair status management table 2700) which is the identification sign provided to the storage apparatus 10 of the RCU.

Secondary Volume Page Discard Information 2900

FIG. 29 shows an example of the configuration of secondary volume page discard information 2900. The secondary volume page discard information 2900 includes a page discard bit 2906 of an RCU secondary volume 132 corresponding to an MCU primary volume 131 as the discard target.

In the secondary volume page discard information 2900, a port number 2901 and a page number 2902 in the channel board 11 of the storage apparatus 10 of the MCU, an apparatus number 2903 which is the apparatus identification sign of the storage apparatus 10 of the RCU, a port number 2904 and a page number 2905 in the channel control unit 110 are made to correspond to each other and recorded.

If the pair status is pair, the MCU channel command control unit 1102, without also writing zero data to the secondary volume 132 and setting a page discard bit 2002, cannot notify the host device 2 of a zero data write completion. Therefore, if, as in the case of local copy, page discard of the secondary volume 132 is determined at the time of differential copy to the secondary volume 132, the page discard management table 2000 or all the data in the relevant page is supposed to be checked, the notification to the host device 2 of the zero data write completion is delayed.

In this embodiment, at the time of receiving a page discard command 1800, a page discard address of the secondary volume 132 is identified, at the time of the copy to the secondary volume 132, the page discard information ascertained in advance is utilized, and the discard information is transmitted to the RCU. By this method, it becomes unnecessary to check the page discard management table 2000 or check all the data in the page, and the zero data write completion can be notified early to the host device 2. Note that, as in the case of local copy, the configuration in which, at the time of the data copy from the primary volume 131 to the secondary volume 132, whether to discard a page in the secondary volume 132 or not is determined and, if the page is to be discarded, the page discard bit 2002 in the secondary volume 132 is set to 1 to perform the page discard may also be permitted. This is the same in the asynchronous remote copy configuration using journals which is described later related to Embodiment 3.

Page Discard Processing Flow in Synchronous Remote Copy Configuration (Pair Status)

In case of synchronous remote copy, at the time of accepting a page discard command from the host device 2 to the primary volume 131, in the pair status, after the zero data is written to the primary volume 131, writing the zero data to the secondary volume 132 is instructed next, the communication for setting the page discard bit 2002 of the page discard management table 2000 (151) to 1 is performed, and the page discard processing of the RCU is started up. After the processing is completed, the page discard bit 2002 of the page discard management table 2000 of the primary volume 131 is set to 1, the page discard processing of the MCU is started up, and the write completion is notified to the host device 2.

Figure 30:
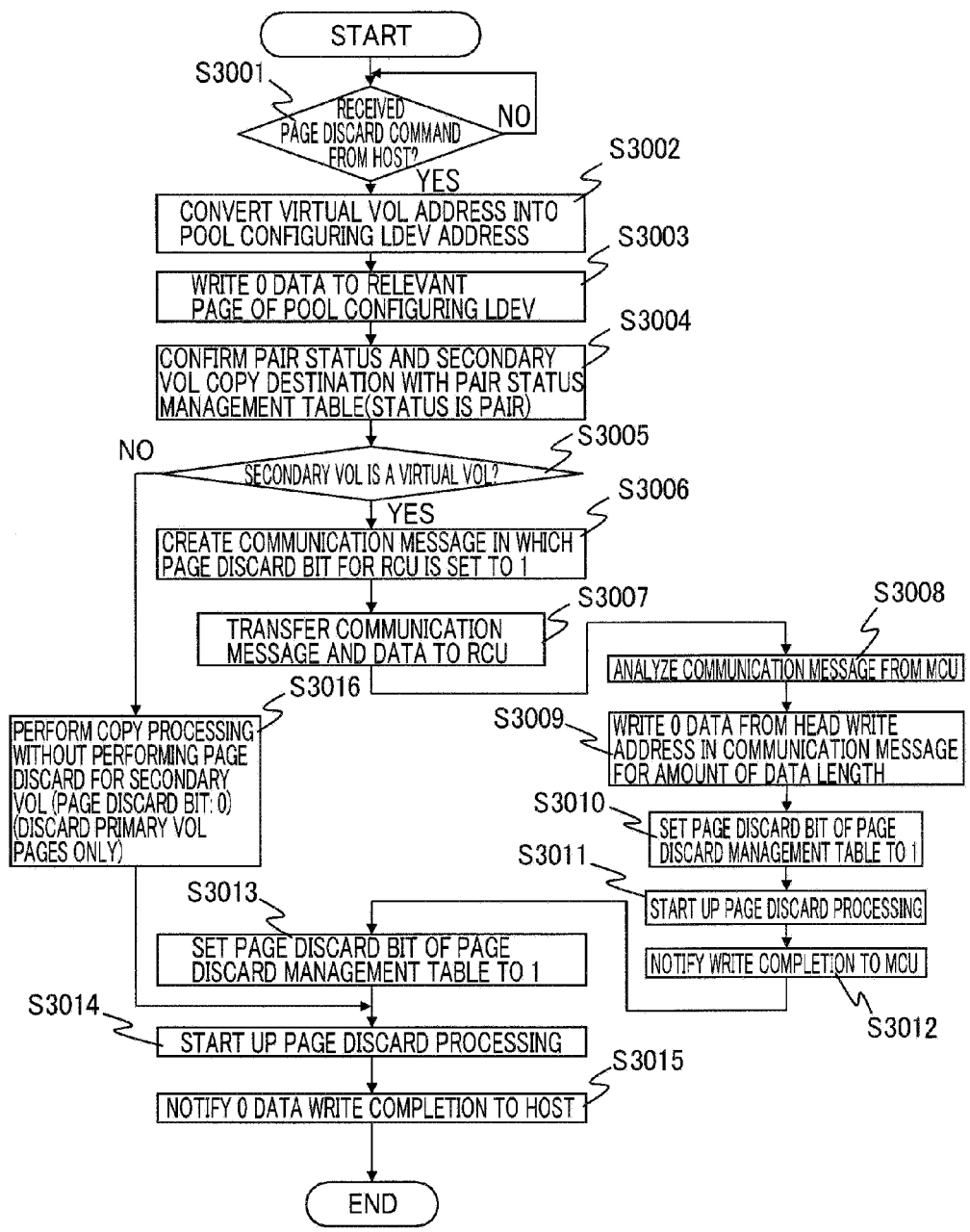
FIG. 30 is an example of the flow of the page discard processing in the synchronous remote copy configuration (pair status).

FIG. 30 shows an example of the page discard processing flow in the copy pair configuration of the synchronous remote copy in the pair status.

Firstly, the channel command control unit 1102 in the channel control unit 110 of the MCU, as in the case of the local copy configuration, waits for the reception of a page discard command 1800 specifying the address of the discard target from the host device 2 to the primary volume 131 of the MCU (S3001, No). If the MCU channel command control unit 1102 receives a page discard command 1800 from the host device 2 (S3001, Yes), the channel command control unit 1102 converts the address of the virtual volume 190 specified by the command from the host device 2, with reference to the LU management table 1103, the virtual LDEV management table 1104, the pool management table 1105, and the mapping management table 1106, into a pool configuring LDEV number 11064 and an address 11065 of the same (S3002).

The channel command control unit 1102 instructs the disk control unit 120 to write the zero data to the address 11065 ascertained at S3002, and the MCU disk control unit 120 writes the zero data to the relevant address 11065 (S3003).

The MCU channel command control unit 1102, from the pair status management table 2700 in the shared memory 15, acquires the apparatus number 2703, the port number 2704, the slot number 2705, and the copy pair status 2706 of the RCU secondary volume 132 corresponding to the discard page of the primary volume 131 and the information whether the secondary volume is a virtual volume or not (determined by the information of the virtual volume bit 11034 and others recorded in the LU management table 1103) (S3004). In FIG. 30, the primary volume 131 and the secondary volume 132 are assumed to be in the pair status.

Next, the MCU channel command control unit 1102 determines whether the secondary volume 132 identified at S3004 is a virtual volume 190 or not (S3005) and, if determining that [the secondary volume is] not a virtual volume 190 (S3005, No), sets the page discard bit 2812 in the communication message 2800 to the RCU channel command control unit 1102 to 0 (page discard for the secondary volume 132: off), and performs the normal synchronous remote copy processing (S3016).

If determining at S3005 that the secondary volume 132 is a virtual volume 190 (S3005, Yes), the MCU channel command control unit 1102 sets the page discard bit 2812 to 1 (page discard for the secondary volume: on), and creates a communication message 2800 (S3006).

Next, the MCU channel command control unit 1102 transmits the created communication message 2800 and the zero data to the storage apparatus 10 identified by the write destination apparatus number 2813 (S3007). At this time, if the zero data for the amount of the page capacity (42 MB in this embodiment) is transmitted, the communication line between the channel control units 110 is strained, and therefore it is preferable that the zero data for only the amount of the minimum capacity of the data storage unit is transmitted (e.g. 512 bytes). Note that, as the normal data copy processing, the zero data of 42 MB which is the amount of one page may also be transmitted. In the remote copy configuration described below, similarly, the transferred zero data may be only the amount of the minimum capacity or may also be the amount of the entire data length. Furthermore, it may also be permitted that, if the page discard bit 2812 is 1, the zero data is not transferred from the MCU to the RCU and, if the RCU page discard bit 2002 is 1, the RCU channel command control unit 1102 is configured to write the zero data from the head write address for the amount of the data length.

The channel command control unit 1102 in the RCU channel control unit 110 receives a communication message 2800 from the MCU channel control unit 110, and analyzes the contents of the same (S3008). If the page discard bit 2812 recorded in the communication message 2800 is 1, the channel command control unit 1102 writes the transmitted zero data from the head write address 2814 in the command unit 2810 for the amount of the data length 2815 (S3009). At this step, if the zero data for the amount of the data length is transmitted, the data is written while, if the zero data for the amount of the minimum capacity is transmitted or if no zero data is transmitted, the RCU channel command control unit 1102 performs write from the head address 2814 repeatedly for the amount of the data length 2815.

Next, the RCU channel command control unit 1102 sets the page discard bit 2002 of the page discard target page of the page discard management table 2000 in the shared memory 15 to 1 (S3010), and starts up the page discard processing shown in FIG. 21. (S3011).

The RCU channel command control unit 1102 transmits a zero data write completion message of the RCU to the MCU channel command control unit 1102 (S3012).

The MCU channel command control unit 1102, after receiving the zero data write completion message from the RCU, sets the page discard bit 2002 of the page discard location of the MCU page discard management table 2000 to 1 (S3013). Then, the MCU channel command control unit 1102 starts up the page discard processing in FIG. 21 (S3014). The MCU channel command control unit 1102 transmits a zero data write completion message to the host device 2, and completes the processing (S3015).

According to the above-mentioned configuration, by issuing a page discard command once from the host device 2, the page discard for the primary and secondary volumes 131 and 132 of a synchronous remote copy pair in the pair status can be performed.

Page Discard Processing Flow for Remote Copy Pair (Suspend Status)

In case of the synchronous remote copy in the suspend status, as the data communication is not performed between the primary and secondary volumes until the resync for the primary and secondary volumes is performed, the difference of the stored data between the primary volume 131 and the secondary volume 132 and the discard page information of the secondary volume 132 must be managed. In this embodiment, the differential data information is managed by the differential bitmap 1900 (152) held in the shared memory 15. The differential bitmap 1900 is the same as what is shown in FIG. 19 for the case of the local copy configuration. As the case of local copy, the differential management unit by the differential bitmap 1900 may be the slot unit or may also be any other storage area unit.

When the channel control unit 110 of the MCU storage apparatus 10 receives a page discard command from the host device 2, the channel command control unit 1102 also creates page discard information for the secondary volume 132 (the RCU) (hereinafter referred to as "secondary volume page discard information" (FIG. 29)), and holds the same, for example, in the shared memory 15. Then, the channel command control unit 1102, when receiving a command for the resync between the primary and secondary volumes, in accordance with this secondary volume page discard information 2900, sets a page discard bit 2812 in the communication message 2800 to be created.

Figure 31A:
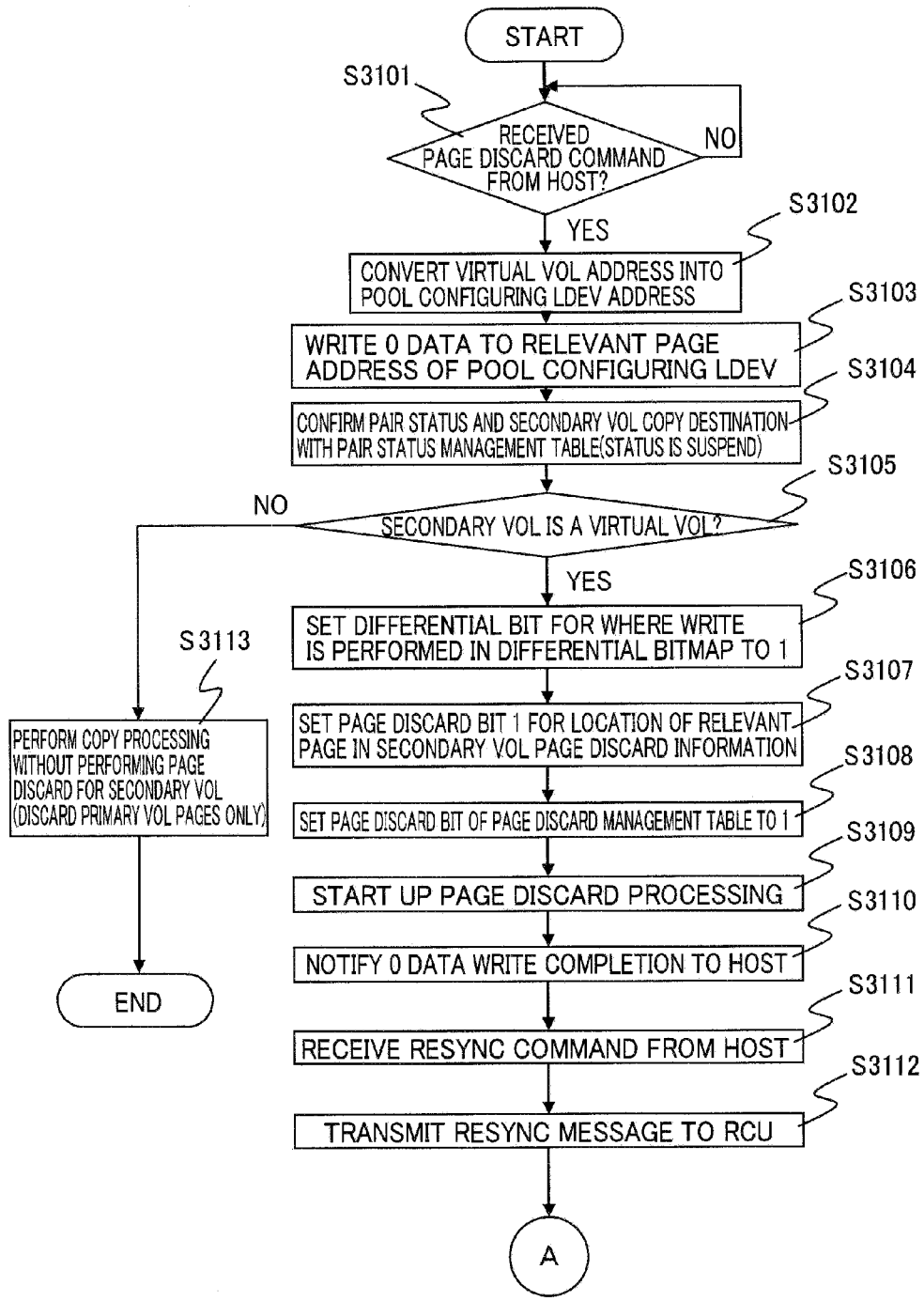
FIGS. 31A and 31B show an example of the page discard processing flow in the remote copy pair configuration in the suspend status.
Figure 31B:
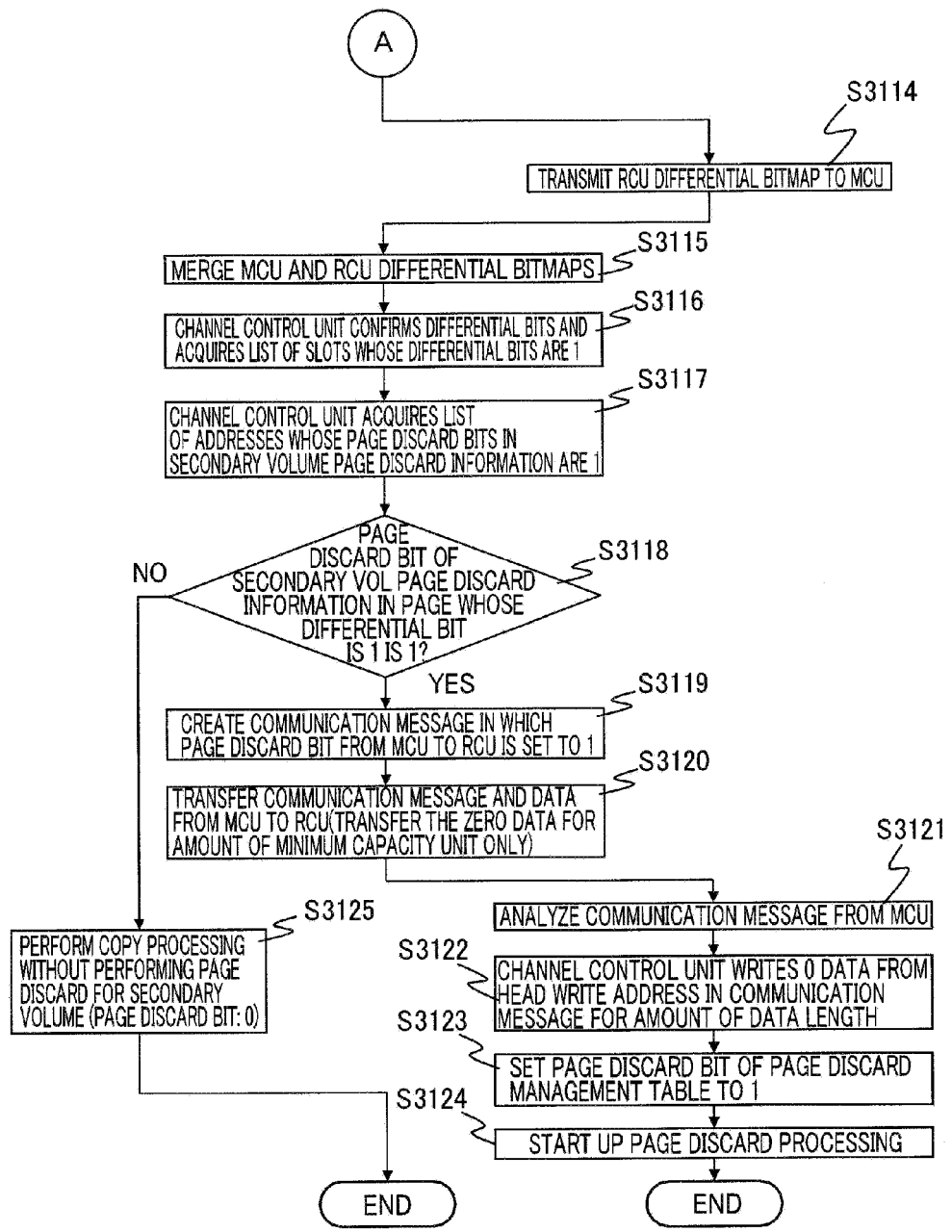

FIG. 31A and 31B show an example of the page discard processing flow in the remote copy pair configuration in the suspend status.

Firstly, the channel command control unit 1102 of the MCU channel control unit 110 waits for the reception of a page discard command from the host device 2 (S3101) and, if receiving a page discard command (S3101, Yes), with reference to the LU management table 1103, the virtual LDEV management table 1104, the pool management table 1105, and the mapping management table 1106, converts the virtual LDEV address 11063 corresponding to the page number 11062 included in the page discard command into a pool configuring virtual LDEV 11064 (S3102), and writes the zero data to the relevant address (S3103).

The MCU channel command control unit 1102, from the pair status management table 2700 in the shared memory 15, acquires the apparatus number 2703, the port number 2704, the slot number 2705, and the copy pair status 2706 of the RCU secondary volume 132 corresponding to the discard page of the primary volume 131 and the information whether the secondary volume is a virtual volume or not (determined by the information of the virtual volume bit 11034 and others recorded in the LU management table 1103) (S3104). In FIG. 31A and FIG. 31B, the primary and secondary volumes 131 and 132 are assumed to be in the suspend status.

Next, the MCU channel command control unit 1102 determines whether the secondary volume 132 identified at S3104 is a virtual volume 190 or not (S3105) and, if determining that [the secondary volume is] not a virtual volume 190 (S3105, No), sets the page discard bit 2812 in the communication message 2800 to the RCU channel command control unit 1102 to 0 (page discard for the secondary volume 132: off), and performs the normal synchronous remote copy processing (S3113).

If determining at S3105 that the secondary volume 132 is a virtual volume 190 (S3105, Yes), the MCU channel command control unit 1102 sets the primary volume differential bit 1902 of the location in the differential bitmap 152 (1900) in the shared memory 15 where write was performed to 1 (S3106).

Next, the MCU channel command control unit 1102, in the secondary volume page discard information 154 (2900) in the shared memory 15, sets the page discard bit 2906 of the secondary volume 132 corresponding to the page for which the page discard is performed in the primary volume 131 to 1 (S3107).

The MCU channel command control unit 1102 sets the page discard bit 2002 of the MCU page discard management table 2000 to 1 (S3108), and starts up the page discard processing shown in FIG. 21. (S3109). Then, the MCU channel command control unit 1102 notifies the host device 2 of the zero data write completion (S3110).

Next, the MCU channel command control unit 1102 receives a resync command from the host device 2 (S3111), and transmits an RCU resync message to the RCU channel control unit 110 (S3112).

The RCU channel command control unit 1102 receiving the resync message transmits the differential bitmap 1900 (152) held in the RCU shared memory 15 to the MCU channel control unit 110 (S3114), and the MCU channel command control unit 1102 receiving this merges both the MCU and RCU differential bitmaps 1900 (S3115). The MCU channel command control unit 1102, by the merged differential bitmap 1900, acquires a list of slots of which the MCU differential bits 1902 or the RCU differential bits 1903 are 1 (S3116).

Furthermore, the MCU channel command control unit 1102 acquires a list of addresses whose page discard bits 2906 are 1 in the secondary volume page discard information 2900 (S3117).

Next, the MCU channel command control unit 1102 determines, in the list acquired at S3116 of the slots whose differential bits 1902 and 1903 are 1, whether the page discard bits 2906 are 1 or not (S3118). If the page discard bits 2906 are determined not to be 1 (S3118, No), the channel command control unit 1102 performs the normal copy processing in which the page discard of the secondary volume 132 is not performed (the page discard bit 2806 in the communication message 2800 is set to 0) (S3125).

If determining the page discard bits 2906 to be 1 (S3118, Yes), the MCU channel command control unit 1102 creates a communication message 2800 in which the page discard bit 2812 is set to 1 (S3119), transmits the same with the zero data (for the amount of the minimum capacity unit or for the amount of the data length) from the MCU channel command control unit 1102 to the RCU channel command control unit 1102 (S3120). However, if the page discard bit 2002 in the RCU is 1 and if the zero data for the amount of the data length is written from the head write address even though the zero data is not transferred from the MCU, the MCU channel command control unit 1102 does not transmit the zero data. After transmitting the message 2800 to the RCU, the MCU channel command control unit 1102 returns the differential bits 1902, 1903 and the page discard bit 2906 in the differential bitmap 1900 and the secondary volume page discard information 2900 from 1 to 0. Furthermore, the RCU channel command control unit 1102 returns the differential bits 1902, 1903 of the RCU differential bitmap 1900 from 1 to 0.

The channel command control unit 1102 in the RCU channel control unit 110 receives a communication message 2800 from the MCU channel control unit 110 and analyzes the contents of the same (S3121). If the page discard bit 2812 recorded in the communication message 2800 is 1, the channel command control unit 1102 writes the transmitted zero data repeatedly from the head write address 2814 in the command unit 2810 for the amount of the data length 2815 (S3122). Note that, if the zero data for the amount of the data length is transmitted, the RCU channel command control unit 1102 writes all of the zero data. Furthermore, as described above, it may also be permitted that, if the page discard bit 2812 is 1, the zero data is not transferred from the MCU to the RCU and, if the RCU page discard bit 2002 is 1, the RCU channel command control unit 1102 is configured to write the zero data from the head write address for the amount of the data length.

Next, the RCU channel command control unit 1102 sets the page discard bit 2002 of the page discard target page of the page discard management table 2000 in the shared memory 15 to 1 (S3123), and starts up the page discard processing shown in FIG. 21. (S3124).

By the above-mentioned configuration, if the primary and secondary volumes 131 and 132 configuring a synchronous remote copy pair are in the suspend status, by a page discard request once from the host device 2, the page discard processing in the secondary volume 132 can be performed.

Embodiment 3
Page Discard Processing in Asynchronous Remote Copy Configuration Utilizing Journals Next, the page discard processing in the asynchronous remote copy configuration utilizing journals is described.

In the above-mentioned synchronous remote copy, by setting the page discard bit 2812 in the communication message 2800 to be transmitted from the MCU channel control unit 110 to the RCU channel control unit 110, whether the communicated data is related to a page discard target page or not was transmitted from the MCU to the RCU. If the journals which are described later are utilized in the asynchronous remote copy configuration, by setting a page discard bit indicating whether page discard is necessary or not in the control information of the journal (hereinafter referred to as "journal control information"), the page discard information is also transmitted to the RCU.

Figure 32:
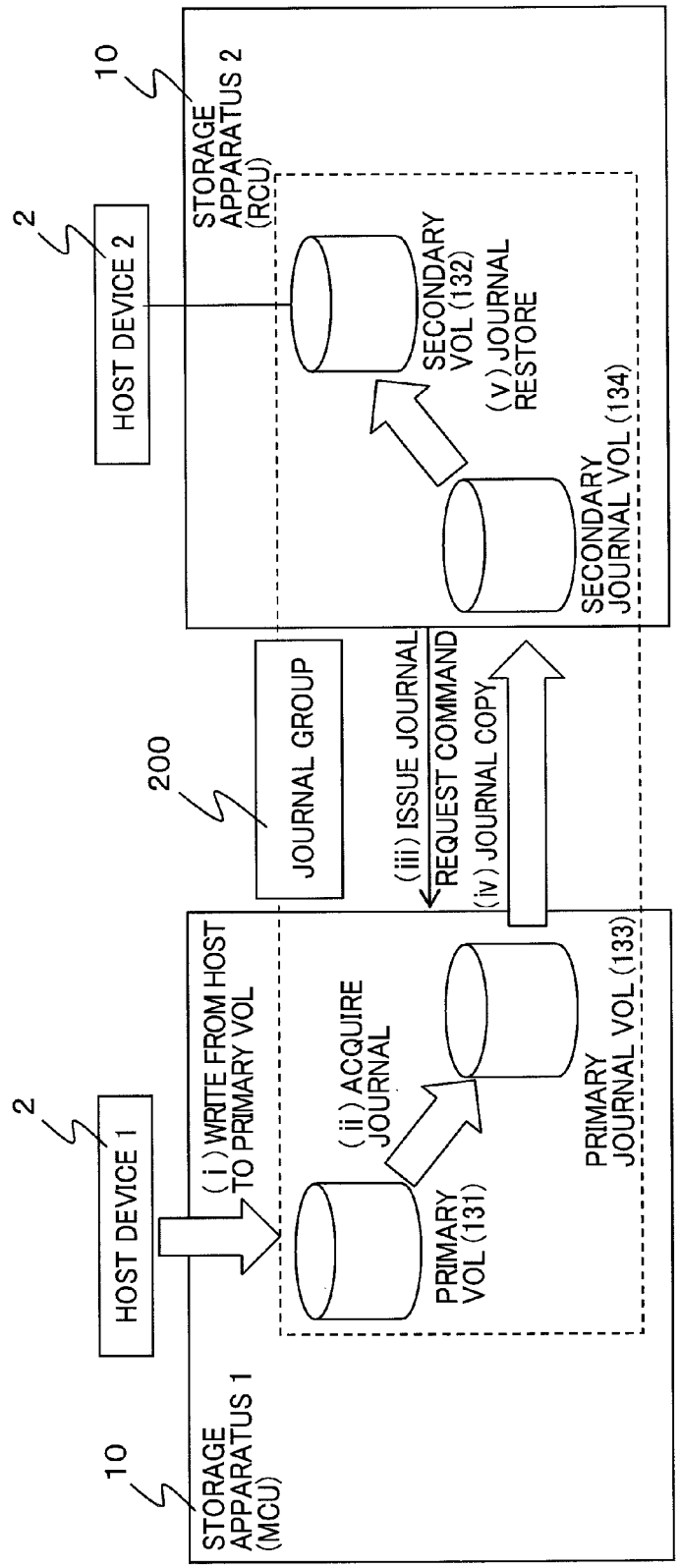
FIG. 32 is a schematic diagram showing the configuration of asynchronous remote copy utilizing journals.

FIG. 32 shows a schematic diagram of the configuration of asynchronous remote copy utilizing journals. In the asynchronous remote copy configuration utilizing journals in this embodiment, a journal group 200 is created and operated. This journal group 200 is configured of a primary volume 131 which is a data storage volume in the MCU, a secondary volume 132 which is a data storage volume in the RCU, and respective primary and secondary journal volumes 133 and 134 of the MCU and the RCU.

Hereinafter, with reference to FIG. 32, the asynchronous remote copy utilizing journals is described. The signs such as (i) indicate the same sign in the figure. If the channel command control unit 1102 in the MCU channel control unit 110 receives a data write request from the host device 2 (i), the channel command control unit 1102 writes data to the primary volume 131 and also acquires a journal (ii). This journal acquisition processing is performed each time data write from the host device 2 is performed. The journal is created as a journal 1300 in the secondary volume 132, for managing the data written to the primary volume 131 and further the order of writing the data.

Figure 34:
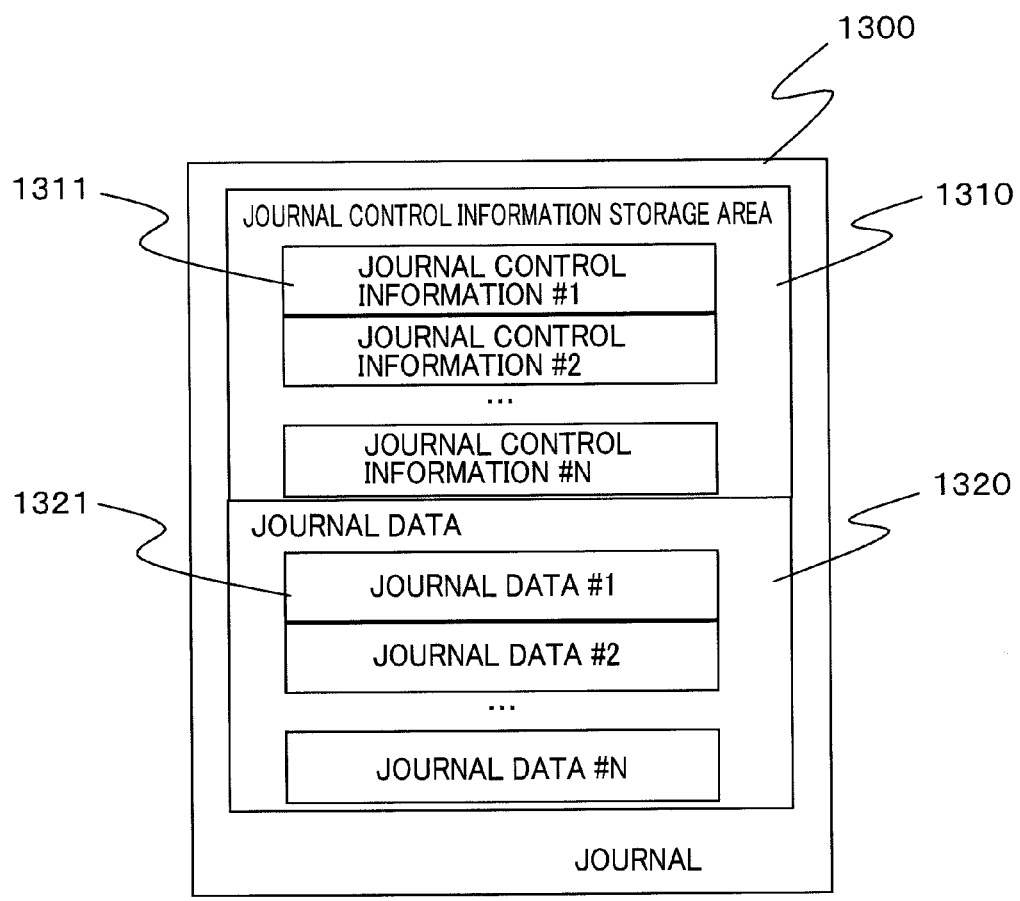
FIG. 34 is an example of the configuration of a journal 1300.

FIG. 34 shows an example of the configuration of the journal 1300. The journal 1300 includes a journal control information storage area 1310 and a journal data storage area 1320. In the journal control information storage are 1310, journal control information 1311 is stored and, in the journal data storage area 1320, the data written from the host device 2 (hereinafter referred to as the "journal data 1321") is stored. The journal control information 1311 is created in units of slots in the cache memory 14 of each storage apparatus 10. The journal control information 1311 and the journal data 1321 created in this MCU cache memory 14 are stored in the primary journal volume 133.

FIG. 35A shows an example of the configuration of the conventional journal control information 1311 (3500). In the journal control information 3500, an LDEV number 3501, a slot number 3502, a head write address 3503, and a data length 3504 of the MCU primary volume 131, an LDEV number 3505, a slot number 3506, and a head write address 3507 of the journal volume 133, and a journal sequence number 3508 are recorded.

The LDEV number 3501 of the primary volume 131 indicates the LDEV of the primary volume 131 storing the journal data 1321 by the combination of the above-mentioned logical control unit number (CU #) and LDEV number (LDEV #). The slot number 3502 indicates the number of the slot storing the journal data 1321. The head write address 3503 indicates the head address of the storage area where the journal data 1321 is written. The data length 3504 indicates the data length of the journal data 1321

The LDEV number 3505 of the journal volume 133 indicates the LDEV of the primary journal volume 133 storing the journal data 1321 by the combination of the above-mentioned logical control unit number (CU #) and LDEV number (LDEV #). The slot number 350 6 indicates the number of the slot of the primary journal volume 133 storing the journal data 1321. The head write address 3507 indicates the head address of the primary journal volume 133 storing the journal data 1321.

The journal sequence number 3508 indicates the sequence number (e.g. a serial integer number starting from 1) assigned at the time of acquiring the journal. The journal sequence number 3508 indicates the order of data write from the host device 2 and, by the secondary volume 132 reflecting the data in accordance with the order specified by this journal sequence number 3508, the order of data update in the primary volume 131 is guaranteed.

Returning to FIG. 32, in the pair status, asynchronously from the access processing from the host device 2 to the MCU storage apparatus 10, a command for reading an MCU journal 1300 from the RCU is transmitted. In the suspend status, when the MCU storage apparatus 10 accepts a resync command from the host device 2 and transmits the resync command from the MCU channel control unit 110 to the RCU channel control unit 110, a command for reading the journal 1300 is issued from the RCU (iii).

When the read command from the RCU is accepted, the journal 1300 is transmitted from the MCU channel control unit 110 to the RCU channel control unit 110, and is stored in the secondary journal volume 134 (iv).

The RCU channel control unit 110, via the disk control unit 120, reflects the data stored in the secondary journal volume 134 in the secondary volume 132 (this processing is hereinafter referred to as "journal restore. (v). At this time, data reflection in the secondary volume 132 is performed in order of journal sequence numbers 3508.

Figure 33:
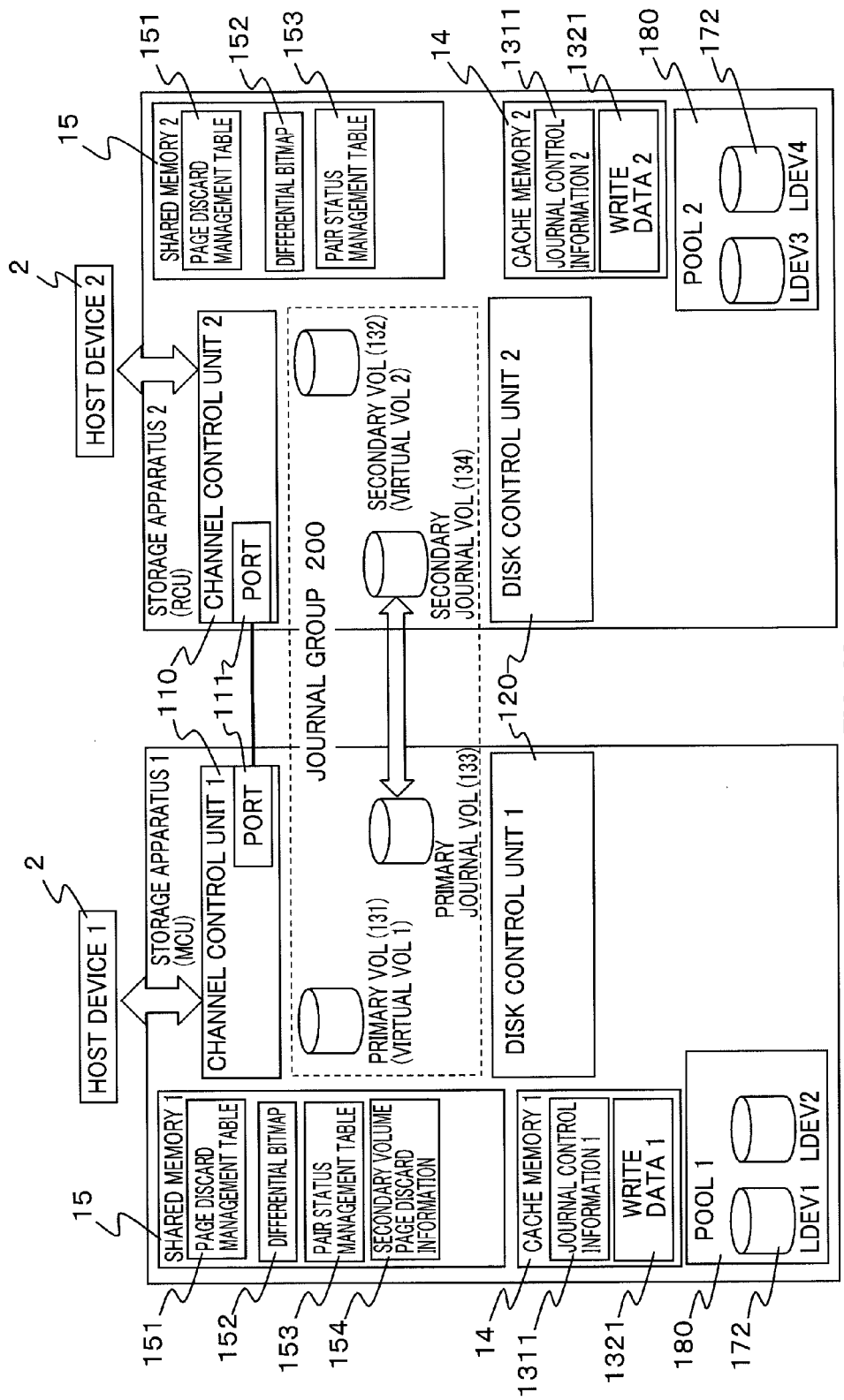
FIG. 33 is a schematic diagram showing the configuration of the storage system 1 in Embodiment 3.

FIG. 33 shows an example of the configuration of the storage system 1 including the asynchronous remote copy configuration utilizing journals. In FIG. 33, the configuration of each storage apparatus 10 is nearly the same as the case of the local copy configuration shown in FIG. 17 and, as the case of the synchronous remote copy configuration shown in FIG. 26, the storage apparatus 10 as the MCU and the storage apparatus 10 as the RCU are connected as communicable by the channel control units 110 via the communication ports 111.

As communication methods between the communication ports 111, for example, LAN, SAN, the internet, a public telecommunication network and others can be utilized. By these communicable channel control units 110, the primary volume 131 created in the MCU and the secondary volume 132 created in the RCU configure a copy pair of the asynchronous remote copy method. Furthermore, as described related to FIG. 32, the primary journal volume 133 is created and operated in the MCU while the secondary journal volume 134 is created and operated in the RCU and, with the primary and secondary volumes 131, 132, the journal volumes configure a journal group 200.

In the shared memory 15 existing in each of the storage apparatuses 10 of the MCU and the RCU, a page discard management table 151, a differential bitmap 152, and a pair status management table 153 are held, and furthermore, in the shared memory 15 of the MCU, secondary volume page discard information 154 is held.

In the cache memory 14 of the MCU and the RCU, as described related to FIG. 34, the journal control information 1311 and the journal data 1321 are held.

The LU management table 1103, the virtual LDEV management table 1104, the pool management table 1105, the mapping management table 1106, and the pool configuring LDEV management table 1107 stored in the memory 113 of the channel control unit 110 are the same as the case of the local copy configuration. Furthermore, the page discard management table 151 and the differential bitmap 152 held in the memory 113 or the shared memory 15 of the channel board 11 also include the equal configuration to the case of the local copy configuration.

If the MCU channel control unit 110 accepts a write request from the host device 2, the channel command control unit 1102 in the channel control unit 110 stores the write data in the cache memory 14, and creates the corresponding journal control information 1311 also in the cache memory 14. The journal data 1321 is written to the primary volume 131 which is a virtual volume 190 (actually a pool configuring LDEV 172) at an appropriate timing. Furthermore, the journal control information 1311 and the journal data 1321 (write data) are stored in the primary journal volume 133.

Next, the journal control information 1311 (3500) and the pair status management table 153 (2700) with the different configuration from the case of the synchronous remote copy configuration are described.

Journal Control Information 3500 (1311)

FIG. 35B shows an example of the configuration of the journal control information 3500 in this embodiment. The journal control information 3500 in this embodiment has basically the same configuration as the conventional journal control information 3500 shown in FIG. 35A and is different in that, for each record of the journal control information 3500, a page discard bit 3509 to be used for discarding the page assigned to the secondary journal volume 134 is added. As the journal control information 3500 is created in units of slots and a page is configured of multiple slots, by setting page discard bits 3509 in units of slots, the page discard information can be transmitted from the MCU to the RCU.

Pair Status Management Table 3600 (153)

FIG. 36 shows an example of the configuration of the pair status management table 3600 in this embodiment. This pair status management table 3600 has basically the same configuration as the pair status management table 2700 in the synchronous remote copy configuration shown in FIG. 27 and is different in that, for each record, a journal pair number 3601 which is a management number for identifying the corresponding journal group 200 (a pair of primary and secondary journal volumes) is added.

Page Discard Processing Flow in Asynchronous Remote Copy Utilizing Journals (Pair Status)

Figure 37:
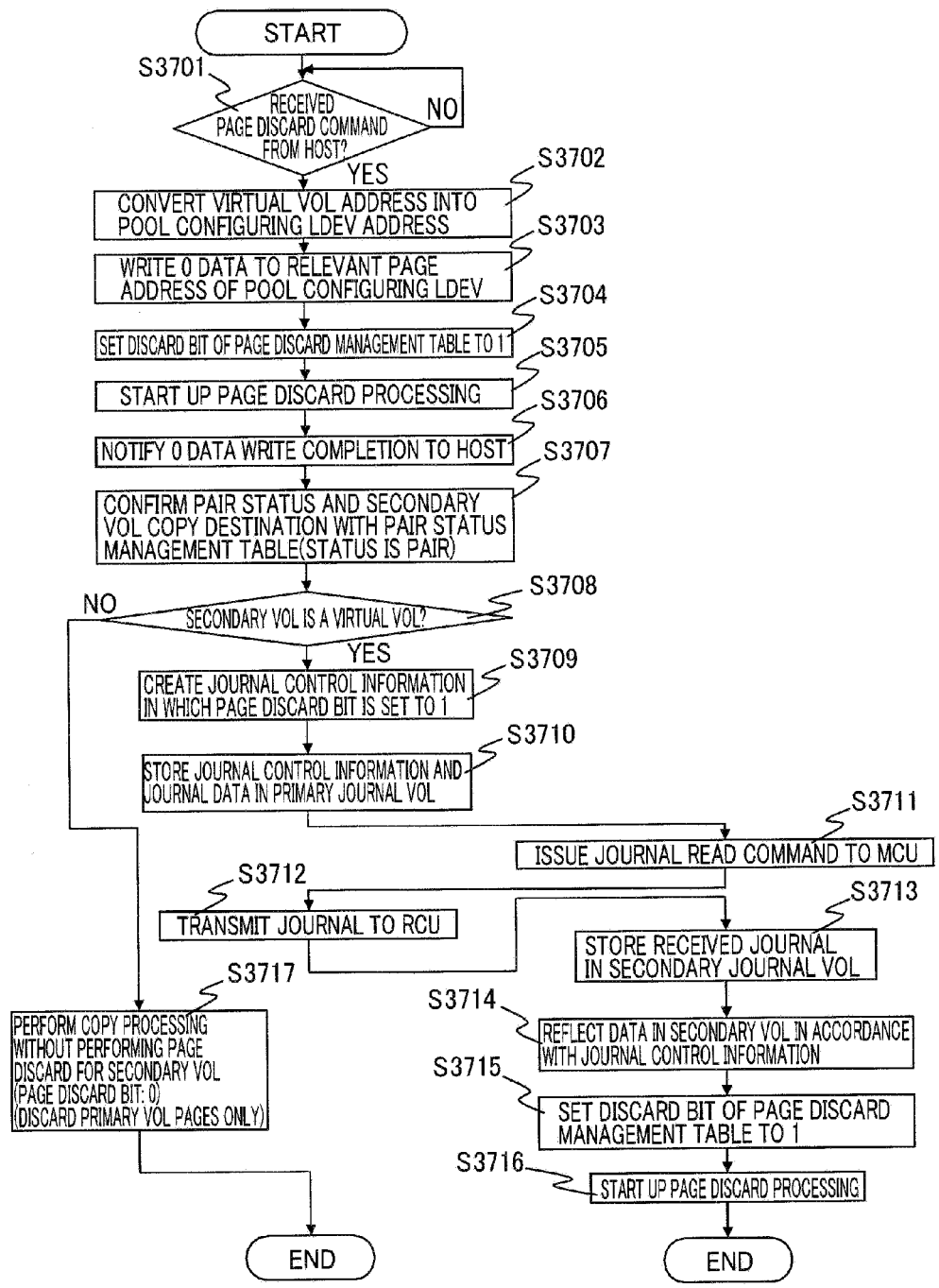
FIG. 37 is an example of the flow of the page discard processing in the asynchronous remote copy configuration utilizing journals (pair status).

FIG. 37 shows an example of the page discard processing flow in the copy pair configuration of the asynchronous remote copy utilizing journals in the pair status. In this processing flow, nearly the same processing as the case of the synchronous remote copy configuration described in FIG. 30 is performed. In the synchronous remote copy configuration, the page discard bit 2812 is stored in the communication message 2800 while, in this processing flow, as the journal 1300 includes the journal control information 3500 in units of slots, by adding the page discard bit 3509 to this journal control information 3500, the discard target page is configured to be transmitted to the RCU channel control unit 110. Note that, as the case of the local copy, the configuration in which, at the time of the data copy from the primary volume 131 to the secondary volume 132, whether to discard a page in the secondary volume 132 or not is determined and, if [the page] is to be discarded, the page discard bit 2002 of the page in the secondary volume 132 is set to 1 to perform the page discard may also be permitted.

Firstly, the channel command control unit 1102 in the MCU channel control unit 110, as in the case of the synchronous remote copy configuration, waits for [the reception of] a page discard command 1800 specifying the address of the discard target from the host device 2 to the MCU primary volume 131 (S3701, No). If the MCU channel command control unit 1102 receives a page discard command 1800 from the host device 2 (S3701, Yes), the channel command control unit 1102 converts the address of the virtual volume 190 specified in the command by the host device 2, with reference to the LU management table 1103, the virtual LDEV management table 1104, the pool management table 1105, and the mapping management table 1106, into a pool configuring LDEV number 11064 and an address 11065 of the same (S3702).

The channel command control unit 1102 instructs the disk control unit 120 to write zero data to the address 11065 ascertained at S3702, and the MCU disk control unit 120 writes zero data to the relevant address 11065 (S3703).

The MCU channel command control unit 1102 sets the page discard bit 2002 of the corresponding page discard management table 2000 to 1 (S3704), and starts up the page discard processing shown in FIG. 21. (S3705).

Next, the MCU channel command control unit 1102 notifies the host device 2 of the zero data write completion (S3706).

Next, the MCU channel command control unit 1102, from the pair status management table 3600 (151) in the shared memory 15, acquires the apparatus number 3604, the port number 3605, and the slot number 3606 of the RCU secondary volume 132 corresponding to the discard page of the primary volume 131, the copy pair status 3607, and the information whether the secondary volume is a virtual volume or not (determined by the information of the virtual volume bit 11034 and others recorded in the LU management table 1103) (S3707). In FIG. 37, the primary and secondary volumes 131, 132 are assumed to be in the pair status.

Next, the MCU channel command control unit 1102 determines whether the secondary volume 132 identified at S3707 is a virtual volume 190 or not (S3708) and, if determining [the volume] not to be a virtual volume 190 (S3708, No), sets the page discard bit 3509 of the corresponding journal control information 1311 to 0 (page discard for the secondary volume 132: off), and performs the normal asynchronous remote copy processing (S3717).

If determining at S3708 that the secondary volume 132 is a virtual volume 190 (S3708, Yes), the MCU channel command control unit 1102 sets the page discard bit 3509 to 1 (page discard for the secondary volume: on), and creates journal control information 3500 (S3709).

Next, the MCU channel command control unit 1102 stores the created journal control information 3500 and the journal data 1321 in the primary journal volume 133 (S3710).

The RCU channel command control unit 1102 issues a command for reading the storage data of the primary journal volume 133 to the MCU channel command control unit 1102 (S3711), and the MCU channel command control unit 1102 receiving this command transmits the storage data of the primary journal volume 133 to the RCU channel command control unit 1102 (S3712).

The channel command control unit 1102 in the RCU channel control unit 110 stores the storage data of the primary journal volume 133 received from the MCU channel control unit 110 in the secondary journal volume 134 (S3713). Then, the RCU channel command control unit 1102, in accordance with the journal sequence numbers 3508, copies the data to the secondary volume 132 (S3714). Next, the RCU channel command control unit 1102 sets the page discard bit 2002 of the page discard management table 2000 to 1 (S3715), starts up the page discard processing shown in FIG. 21, and completes the processing (S3716).

According to the above-mentioned configuration, by issuing a page discard command once from the host device 2, the page discard for the primary and secondary volumes 131 and 132 of the an asynchronous remote copy pair utilizing journals in the pair status can be performed.

Note that setting the zero data to be transmitted from the MCU to the RCU to the required data length (e.g. 256 KB) in the journal control information 3500 and performing the communication with the actually transmitted data by the minimum capacity unit (e.g. 512 bytes) is preferable from the perspective of reducing the load on the communication line between the MCU and RCU channel control units 110. In the RCU channel control unit 110, after the transfer, the zero data for the amount of the length specified by the data length 3504 in the journal control information 3500 can be written repeatedly. Furthermore, it may also be permitted that, if the page discard bit 3509 is 1, the zero data is not transferred from the MCU to the RCU and that, if the page discard bit 2002 in the RCU is 1, the RCU channel command control unit 1102 is configured to write the zero data from the head write address for the amount of the data length, or the configuration in which the zero data is transmitted for the amount of the required data length may also be permitted.

Page Discard Processing Flow in Asynchronous Remote Copy Configuration Utilizing Journals (Suspend Status)

Figure 38A:
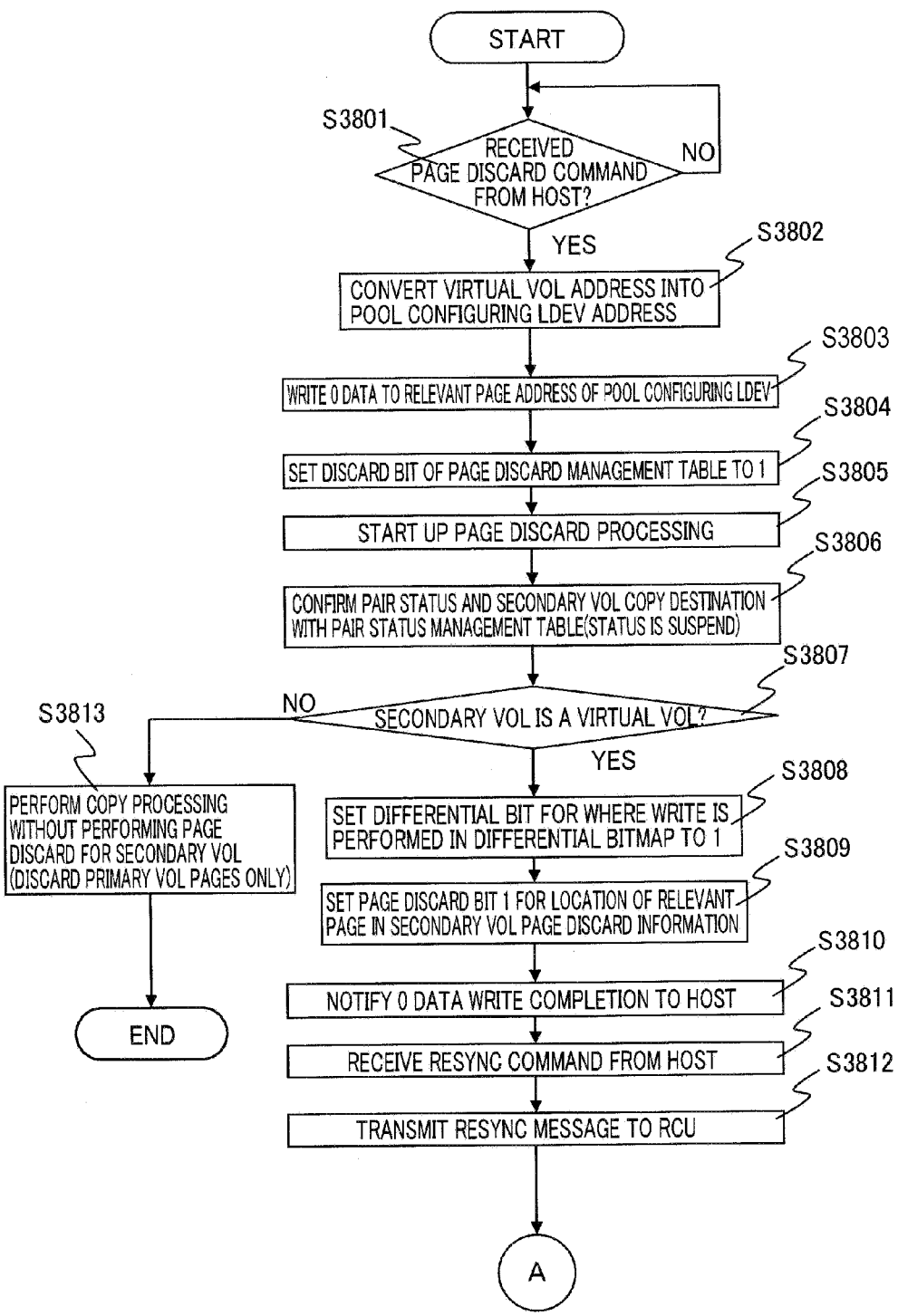
FIG. 38A and 38B show an example of the flow of the page discard processing in the asynchronous remote copy configuration utilizing journals (suspend status).
Figure 38B:
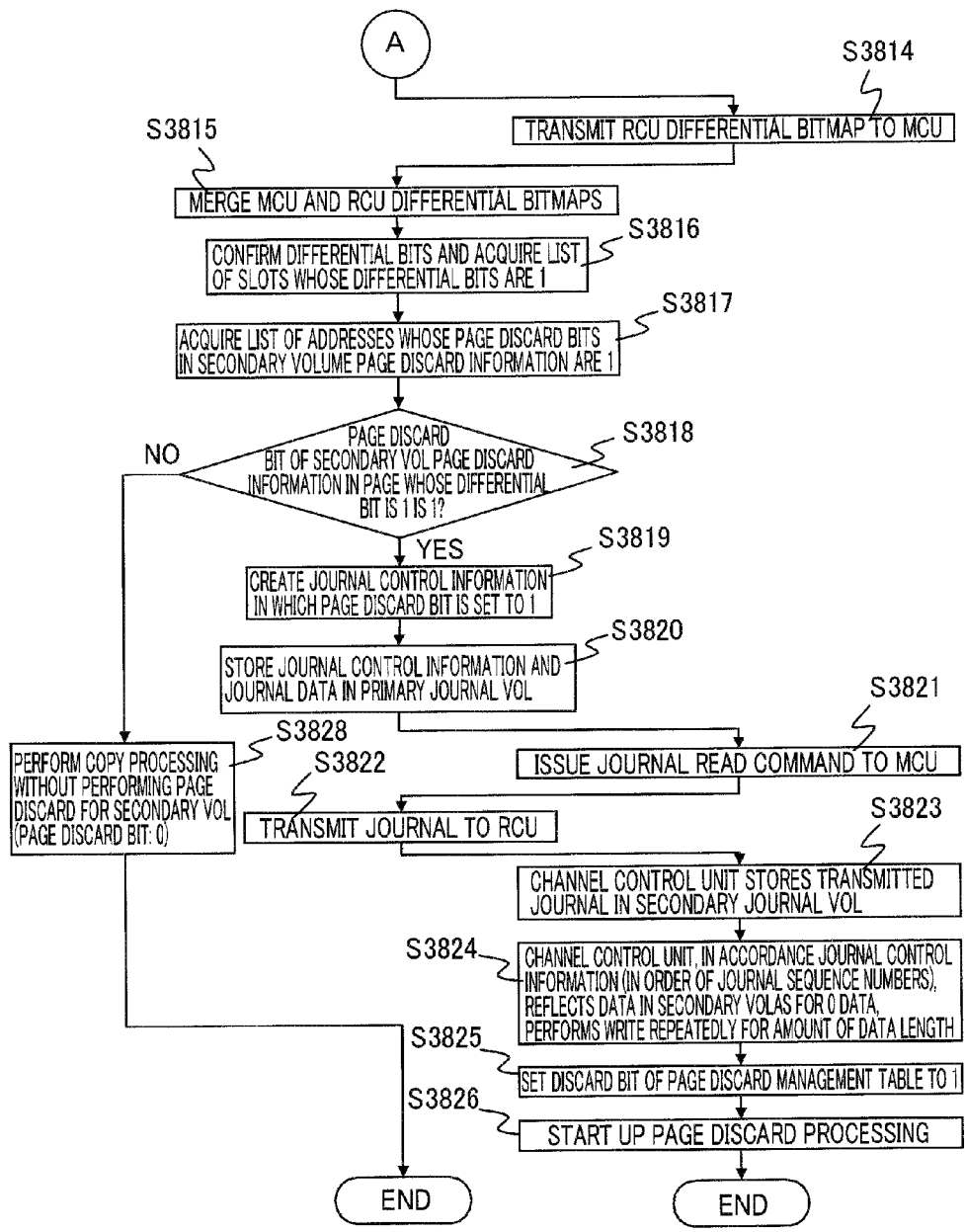

Next, the page discard processing flow in the asynchronous remote copy configuration utilizing journals in the suspend status is described. FIG. 38A and FIG. 38B show an example of the processing flow in the suspend status. The processing flow in FIG. 38A and FIG. 38B is different from the processing flow in the pair status shown in FIG. 37 in that a differential bitmap 152 (in the same configuration as in the local copy configuration) is utilized for differential management, that secondary volume page discard information 154 is utilized in the shared memory 15 of the primary volume 131, and that, before the RCU issues a journal read command, the MCU channel control unit 110 accepts a resync command from the host device 2 and transmits a resync message based on the same to the RCU channel control unit 110.

Unlike the pair status, in the suspend status, after accepting a resync command from the host device 2, a journal 1300 is transmitted to the secondary volume 132. Therefore, the MCU includes the page discard information of the secondary volume 132 in the secondary volume page discard information 2900 in the shared memory 15.

Firstly, the channel command control unit 1102 in the MCU channel control unit 110, as in the case of the synchronous remote copy configuration, waits for a page discard command 1800 specifying the address of the discard target for the MCU primary volume 131 from the host device 2 (S3801, No). If receiving a page discard command 1800 in the MCU channel command control unit 1102 from the host device 2 (S3801, Yes), the channel command control unit 1102 converts the address of the virtual volume 190 specified in the command by the host device 2, with reference to the LU management table 1103, the virtual LDEV management table 1104, the pool management table 1105, and the mapping management table 1106, into a pool configuring LDEV number 11064 and an address 11065 of the same (S3802).

The channel command control unit 1102 instructs the disk control unit 120 to write the zero data to the address 11065 ascertained at S3802, and the MCU disk control unit 120 writes the zero data to the relevant address 11065 (S3803).

The MCU channel command control unit 1102 sets the page discard bit 2002 of the corresponding page discard management table 2000 to 1 (S3804), and starts up the page discard processing shown in FIG. 21 (S3805).

Next, the MCU channel command control unit 1102, from the pair status management table 3600 (151) in the shared memory 15, acquires the apparatus number 3604, the port number 3605, the slot number 3606, and the copy pair status 3607 of the RCU secondary volume 132 corresponding to the discard page of the primary volume 131 and the information whether the secondary volume is a virtual volume or not (determined by the information of the virtual volume bit 11034 and others recorded in the LU management table 1103) (S3806). In FIG. 38A, the primary and secondary volumes 131 and 132 are assumed to be in the suspend status.

Next, the MCU channel command control unit 1102 determines whether the secondary volume 132 identified at S3806 is a virtual volume 190 or not (S3807) and, if determining that [the secondary volume is] not a virtual volume 190 (S3807, No), sets the page discard bit 3509 in the corresponding journal control information 3500 to 0 (page discard for the secondary volume 132: off), and performs the normal asynchronous remote copy processing (S3813).

If determining at S3807 that the secondary volume 132 is a virtual volume 190 (S3807, Yes), the MCU channel command control unit 1102 sets the primary volume differential bit 1902 of the location where write was performed in the differential bitmap 152 (1900) in the shared memory 15 to 1 (S3808).

Next, the MCU channel command control unit 1102, in the secondary volume page discard information 2900 in the shared memory 15, sets the page discard bit 2906 of the secondary volume 132 corresponding to the page for which page discard is performed in the primary volume 131 to 1 (S3809). The MCU channel command control unit 1102 notifies the host device 2 of the zero data write completion (S3810).

Next, the MCU channel command control unit 1102 accepts a resync command from the host device 2 (S3811), and transmits an RCU resync message to the RCU channel control unit 110 (S3812).

The RCU channel command control unit 1102 receiving the resync message transmits a differential bitmap 1900 (152) held in the RCU shared memory 15 to the MCU channel control unit 110 (S3814), and the MCU channel command control unit 1102 receiving this merges both the MCU and the RCU differential bitmaps 1900 (S3815). The MCU channel command control unit 1102, in the merged differential bitmap 1900, acquires a list of slots whose MCU differential bits 1902 or RCU differential bits 1903 are 1 (S3816).

Furthermore, the MCU channel command control unit 1102 acquires a list of addresses whose page discard bits 2906 in the secondary volume page discard information 2900 are 1 (S3817).

Next, the MCU channel command control unit 1102 determines, in the list of slots acquired at S3816 whose differential bits 1902, 1903 are 1, whether the page discard bit 2906 of the secondary volume page discard information 2900 is 1 or not (S3818). If the page discard bit 2906 is determined not to be 1 (S3818, No), the channel command control unit 1102 performs the normal copy processing without performing page discard of the secondary volume 132 (in the case where the page discard bit 3509 of the corresponding journal control information 3500 is 0) (S3828).

If determining at S3818 the secondary volume 132 to be a virtual volume 190 (S3818, Yes), the MCU channel command control unit 1102 sets the page discard bit 3509 to 1 (page discard for the secondary volume: on), and creates journal control information 3500 (S3819).

Next, the MCU channel command control unit 1102 stores the created journal control information 3500 and the journal data 1321 in the primary journal volume 133 (S3820).

The RCU channel command control unit 1102 issues a command for reading the storage data of the primary journal volume 133 to the MCU channel command control unit 1102 (S3821), and the MCU channel command control unit 1102 receiving this command transmits the storage data of the primary journal volume 133 to the RCU channel command control unit 1102 (S3822).

The channel command control unit 1102 in the RCU channel control unit 110 stores the storage data of the primary journal volume 133 received from the MCU channel control unit 110 in the secondary journal volume 134 (S3823). Then, the RCU channel command control unit 1102, in accordance with the journal sequence numbers 3508, copies the data (writes the zero data) to the secondary volume 132 (S3824). Next, the RCU channel command control unit 1102 sets the page discard bit 2002 of the page discard management table 2000 to 1 (S3825), starts up the page discard processing shown in FIG. 21, and completes the processing (S3826).

According to the above-mentioned configuration, by issuing a page discard command once from the host device 2, the page discard for the primary and secondary volumes 131 and 132 of an asynchronous remote copy pair utilizing journals in the suspend status can be performed.

Embodiment 4

Page Discard Processing among Multiple Volumes to which Cascade Configuration is Applied In Embodiments 1 to 3, the page discard methods in the primary and secondary volumes 131, 132 in cases where one secondary volume 132 is made to correspond to one primary volume 131 in each configuration of local copy, synchronous remote copy, and asynchronous remote copy utilizing journals are described.

By utilizing this page discard method, even in the cascade configuration (the configuration in which a copy pair including primary and secondary volumes 131 and 132 exists and, by making the secondary volume 132 a primary volume 131, another copy pair is further created. By making the secondary volume 132 a primary volume 131 and repeatedly creating a copy pair, an unlimited number of copy pairs can be linked), the page discard processing can be performed for all of three or more primary and secondary volumes.

The page discard for all the volumes in this cascade configuration can be realized in all the copy methods and all the copy pair statuses. Hereinafter, the overview of the page discard processing is described with reference to the configuration as an example in which a primary volume 131 and a secondary volume 132 are configured in the synchronous remote copy, and furthermore, by making the secondary volume 132 a primary volume 131, a secondary volume 132 configuring an asynchronous remote copy pair utilizing journals is combined. Note that, as for any copy pair, the case where the pair status is pair is referred to as an example.

Firstly, the channel command control unit 1102 managing a primary volume 131 of a synchronous remote copy pair accepts a page discard command from the host device 2.

The MCU channel command control unit 1102 writes zero data to the corresponding discard page of the synchronous remote copy primary volume 131. The MCU channel command control unit 1102 confirms the pair status and the copy destination of the secondary volume 132 by the synchronous remote copy pair status management table 2700.

The MCU channel command control unit 1102 transmits a communication message 2800 with the page discard bit set to 1 and the zero data from the primary volume 131 of the synchronous remote copy to the secondary volume 132. Note that, as in the cases of Embodiments 1 to 3, the zero data transfer may be in any configuration among transferring the entire amount of the data length, or transmitting the zero data for the minimum capacity unit and repeatedly writing the zero data for the amount of the data length in the RCU, and, without transmitting the zero data, if the page discard bit is 1 in the RCU, writing the zero data for the amount of the data length.

The RCU channel control unit 110 writes the zero data to the relevant page in the secondary volume 132 of the synchronous remote copy. At this step, seen from the side of the asynchronous remote copy utilizing journals, write is considered to have occurred in the primary volume 131. Therefore, by creating the journal control information 3500 in the synchronous remote copy RCU channel control unit 110 which includes the page discard information and transmitting this and the zero data written in the synchronous remote copy to the secondary volume 132 of the asynchronous remote copy utilizing journals, the information of page discard can be transmitted to the secondary volume 132 of the asynchronous remote copy utilizing journals.

According to the above-mentioned configuration, by a page discard command once from the host device 2, unnecessary pages can be discarded in three volumes, the primary volume 131 of synchronous remote copy, the secondary volume 132 of synchronous remote copy (the primary volume 131 of asynchronous remote copy utilizing journals), and the secondary volume 132 of asynchronous remote copy utilizing journals, and the storage resources of the storage apparatus 10 can be utilized more efficiently.

Embodiment 5

Multi-Target Configuration

As a copy pair configuration, the configuration in which multiple secondary volumes 132 are made to correspond to one primary volume 131 can also be considered. In this type of configuration (multi-target configuration), by performing the page discard processing shown in Embodiments 1 to 3 in a copy pair included of one primary volume 131 and one secondary volume 132 for all the secondary volumes 132, only by issuing a page discard command for the channel control unit 110 managing one primary volume 131, the corresponding pages stored in the multiple corresponding secondary volumes 132 can also be discarded.

Embodiment 6
Configuration in which Only Secondary Volume 132 of Copy Pair is Virtual Volume In the configuration in which the primary volume 131 is an actual volume directly assigned to an actual LDEV and the secondary volume 132 is a virtual volume, page discard for the secondary volume 132 can be performed by the processing described below.

Firstly, if the channel control unit 110 of the primary volume 131 receives a page discard command from the host device 2, the channel control unit 110, using the pair status management tables 2200, 2700, and 3600, determines whether the corresponding secondary volume 132 is a virtual volume 190 or not.

If determining that the secondary volume 132 is a virtual volume 190, the channel control unit 110 of the primary volume 131 acquires the address, among the page discard processing for both the primary and secondary volumes 131, 132 shown in Embodiments 1 to 3, only skips the page discard processing of the primary volume 131, and discards the relevant page of the secondary volume 132 corresponding to the primary volume 131.

According to the embodiments of this invention described above in details, in the storage apparatus 10 including a primary volume 131 or a secondary volume 132 included of virtual volumes which configure a copy pair, by requiring the discard processing for the actual storage area assigned to the relevant primary volume 131 of the storage apparatus 10 managing the primary volume 131 from the host device 2, the actual storage area in which the data of the corresponding secondary volume 132 is stored can also be discarded, which inhibits the processing load on the storage apparatus 10 and, at the same time, enables the effort for utilizing storage resources efficiently.

Though the embodiments were described above, the above-mentioned embodiments are intended for ease of understanding this invention and by no means limited to any particular constructions herein disclosed. This invention also includes any changes, modifications or equivalents within the spirit and scope hereof.

The invention claimed is:

1. A storage apparatus having a plurality of logical volumes, each of the plurality of logical volumes providing a data storage area to an external device, the storage apparatus comprising:
   a storage device providing a physical storage area; and
   a storage controller configured to:
   create a plurality of unit physical storage areas from the storage device,
   operate each of the logical volumes as a virtual volume in which, in response to a data input/output (I/O) request from the external device, a unit physical storage area of the plurality of unit physical storage areas is added to each of the logical volumes,
   select any one of the logical volumes as a primary volume, selecting any one of the rest of the logical volumes as a secondary volume, the primary volume and the secondary volume being configured as a copy pair in which data in the primary volume can be copied to the secondary volume,
   wherein the storage controller is provided with a differential bitmap for managing whether or not there is a difference between data in an area in the primary volume and data in an area in the secondary volume corresponding to the area in th primary voltume,
   when the primary volume receives from the external device a discarding request for a first unit physical storage area of the plurality of unit physical storage areas, determine whether or not the first unit physical storage area exists in the secondary volume corresponding to the first unit physical storage area which is a target of the discarding request,
   when it is determined that the first unit physical storage area exists in the secondary volume corresponding to the unit physical storage area which is the target of the discarding request, transmit to the secondary volume an instruction for discarding the first unit physical storage area assigned to the secondary volume, and
   in synchronizing the primary volume and the secondary volume, refer to the differential bitmap, and when there is data difference between the area in the primary volume and the area in the secondary volume corresponding to the area in the primary volume, and when none of the unit physical storage areas is assigned to the area in the primary volume, discard the unit physical storage area assigned to the area in the secondary volume.

2. The storage apparatus according to claim 1,
   wherein when the storage controller determines the primary volume is synchronized with the secondary volume, the storage controller transmits to the secondary volume an instruction for discarding the first unit physical storage area and transmits data stored in the primary volume to the secondary volume,
   wherein, when the storage controller determines the secondary volume is not the virtual volume and a fixed physical storage area created from the storage device is assigned to the secondary volume, the storage controller does not transmit to the secondary volume the instruction for discarding the first unit physical storage area, and
   wherein, when the storage controller determines the primary volume and the secondary volume is in a split status in which a copy for synchronization is not performed therebetween, the storage controller starts a processing for transmitting the instruction for discarding the first unit physical storage area to the secondary volume after it has received from the external device an instruction for resynchronization.

3. The storage apparatus according to claim 1, wherein when the storage controller determines the primary volume is in synchronism with the secondary volume, the storage controller transmits to the secondary volume an instruction for discarding the first unit physical storage area and transmits data stored in the primary volume to the secondary volume.

4. The storage apparatus according to claim 1, wherein when the storage controller determines the secondary volume is not the virtual volume and a fixed physical storage area created from the storage device is assigned to the secondary volume, the storage controller does not transmit to the secondary volume the instruction for discarding the first unit physical storage area.

5. The storage apparatus according to claim 1, wherein when the storage controller determines the primary volume and the secondary volume is in a split status in which a copy for synchronization is not performed therebetween, the storage controller starts a processing for transmitting the instruction for discarding the first unit physical storage area to the secondary volume after it has received from the external device an instruction for resynchronization.

6. A method for controlling a storage apparatus having a plurality of logical volumes, each of the plurality of logical volumes providing a data storage area to an external device, the storage apparatus having a storage device providing a physical storage area, and a storage controller managing the storage device, the method comprising:

creating, by the storage controller, a plurality of unit physical storage areas from the storage device;

operating, by the storage controller, each of the logical volumes as a virtual volume in which, in response to a data input/output (I/O) request from the external device, a unit physical storage area of the plurality of unit physical storage areas is added to each of the logical volumes;

selecting, by the storage controller, any one of the logical volumes as a primary volume, selecting any one of the rest of the logical volumes as a secondary volume, the primary volume and the secondary volume being configured as a copy pair in which data in the primary volume can be copied to the secondary volume;

providing the storage controller with a differential bitmap for managing whether or not there is a difference between data in an area in the primary volume and data in an area in the secondary volume corresponding to the area in the primary volume;

when the primary volume receives from the external device a discarding request for a first unit physical storage area of the plurality of unit physical storage areas, determining, by the storage controller, whether or not the first unit physical storage area exists in the secondary volume corresponding to the first unit physical storage area which a target of the discarding request;

when it is determined that the first unit physical storage area exists in the secondary volume corresponding to the unit physical storage area which is the target of the discarding request, transmitting, by the storage controller, to the secondary volume an instruction for discarding the first unit physical storage area assigned to the secondary volume; and in synchronizing the primary volume and the secondary voltume, referring, by the storage controller, to the differential bitmap, and when there is data difference between the area in the primary volume and the area in the secondary volume corresponding to the area in the primary volume, and when none of the unit physical storage areas is assigned to the area in the primary volume, discarding, by the storage controller, the unit physical storage area assigned to the area in the secondary volume.

* * * * *